US011993882B2

(12) United States Patent
Konishi

(10) Patent No.: US 11,993,882 B2
(45) Date of Patent: May 28, 2024

(54) LIQUID DISCHARGE APPARATUS, EMBROIDERY SYSTEM, METHOD OF CONTROLLING LIQUID DISCHARGE APPARATUS, AND STORAGE MEDIUM

(71) Applicant: Yohsuke Konishi, Kanagawa (JP)

(72) Inventor: Yohsuke Konishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 169 days.

(21) Appl. No.: 17/696,863

(22) Filed: Mar. 17, 2022

(65) Prior Publication Data

US 2022/0307181 A1 Sep. 29, 2022

(30) Foreign Application Priority Data

Mar. 23, 2021 (JP) ................................ 2021-048479

(51) Int. Cl.
*D05C 11/24* (2006.01)
*B41J 2/145* (2006.01)
(Continued)

(52) U.S. Cl.
CPC ............... *D05C 11/24* (2013.01); *B41J 2/145* (2013.01); *B41J 3/4078* (2013.01); *D05C 5/02* (2013.01); *D06P 5/30* (2013.01); *D06P 7/00* (2013.01)

(58) Field of Classification Search
CPC .. D05C 11/24; D05C 5/02; D06P 7/00; D06P 5/30; B41J 3/4078; B41J 2/165; B41J 2002/16573; B41J 2/16579
See application file for complete search history.

(56) References Cited

U.S. PATENT DOCUMENTS 6,189,989 B1 * 2/2001 Hirabayashi .............. D06P 5/30 427/288
9,925,781 B2 * 3/2018 Ono ..................... B41J 2/16552
(Continued)

FOREIGN PATENT DOCUMENTS

CN 102560927 A 7/2012
JP 6-304359 11/1994
(Continued)

OTHER PUBLICATIONS

Office Action dated Jun. 30, 2023 in Chinese Patent Application No. 202210274406.3, 8 pages.
(Continued)

*Primary Examiner* — Danny Worrell
(74) *Attorney, Agent, or Firm* — XSENSUS LLP

(57) ABSTRACT

A liquid discharge apparatus is to be coupled to a post-processing apparatus to perform post-processing using a linear medium such that the post-processing apparatus is disposed downstream from the liquid discharge apparatus in a conveyance direction of the linear medium. The liquid discharge apparatus includes a discharge head, a conveyance mechanism, a head driver, and control circuitry. The discharge head includes a nozzle to discharge droplets onto the linear medium to dye the linear medium. The conveyance mechanism conveys the linear medium in conjunction with the post-processing apparatus. The head driver drives the discharge head in conjunction with conveyance of the linear medium. The control circuitry controls the head driver and determines whether to execute maintenance of the discharge head based on a time required for the post-processing for each dyeing job.

11 Claims, 22 Drawing Sheets

(51) Int. Cl.

| | |
|---|---|
| ***B41J 3/407*** | (2006.01) |
| ***D05C 5/02*** | (2006.01) |
| ***D06P 5/30*** | (2006.01) |
| ***D06P 7/00*** | (2006.01) |

(56) References Cited

U.S. PATENT DOCUMENTS

| | | | | |
|---|---|---|---|---|
| 11,235,598 | B2 * | 2/2022 | Satoh | F26B 23/10 |
| 2014/0349034 | A1 * | 11/2014 | Staberg | B05B 5/14<br>427/580 |
| 2017/0021631 | A1 | 1/2017 | Ono | |
| 2019/0194849 | A1 * | 6/2019 | Eklind | D05C 11/24 |
| 2020/0207087 | A1 * | 7/2020 | Tanaka | D06P 5/30 |
| 2020/0276839 | A1 | 9/2020 | Satoh et al. | |
| 2021/0162737 | A1 * | 6/2021 | Miura | B41J 3/407 |
| 2021/0197557 | A1 * | 7/2021 | Yamaguchi | B41J 2/04573 |
| 2022/0034010 | A1 * | 2/2022 | Eklind | D05B 67/00 |
| 2022/0034011 | A1 * | 2/2022 | Eklind | D03J 1/02 |
| 2022/0042242 | A1 * | 2/2022 | Eklind | D05C 11/24 |
| 2022/0048288 | A1 * | 2/2022 | Eklind | B41J 2/16517 |
| 2022/0056625 | A1 * | 2/2022 | Eklind | D06B 1/02 |
| 2022/0056626 | A1 * | 2/2022 | Eklind | D04B 37/00 |
| 2022/0074098 | A1 * | 3/2022 | Yamashita | B41J 2/16523 |
| 2022/0098776 | A1 * | 3/2022 | Yamashita | D05C 11/24 |
| 2022/0098777 | A1 * | 3/2022 | Sunaoshi | D05C 11/24 |
| 2022/0098778 | A1 * | 3/2022 | Tanaka | D06P 1/0004 |
| 2022/0106720 | A1 * | 4/2022 | Gotoh | D05B 67/00 |
| 2022/0307181 | A1 * | 9/2022 | Konishi | D06B 11/0023 |

FOREIGN PATENT DOCUMENTS

| | | |
|---|---|---|
| JP | 6-305129 | 11/1994 |
| JP | H06-320743 A | 11/1994 |
| JP | 2013-031967 | 2/2013 |
| JP | 2014-233904 | 12/2014 |
| JP | 2020-143891 | 9/2020 |
| JP | 2021-075024 | 5/2021 |
| JP | 2021-112871 | 8/2021 |
| JP | 2021-112883 | 8/2021 |
| WO | 2020/055303 A1 | 3/2020 |
| WO | 2020/137383 A1 | 7/2020 |

OTHER PUBLICATIONS

Partial European Search Report dated Aug. 25, 2022 in European Patent Application No. 22162101.4, 27 pages.

* cited by examiner

COMPARATIVE EXAMPLE 1

COMPARATIVE EXAMPLE 2

EMBODIMENT

LIQUID DISCHARGE APPARATUS, EMBROIDERY SYSTEM, METHOD OF CONTROLLING LIQUID DISCHARGE APPARATUS, AND STORAGE MEDIUM

CROSS-REFERENCE TO RELATED APPLICATION

This patent application is based on and claims priority pursuant to 35 U.S.C. § 119(a) to Japanese Patent Application No. 2021-048479, filed on Mar. 23, 2021, in the Japan Patent Office, the entire disclosure of which is hereby incorporated by reference herein.

BACKGROUND

Technical Field

Embodiments of the present disclosure relate to a liquid discharge apparatus, an embroidery system, a method of controlling the liquid discharge apparatus, and a storage medium.

Related Art

As an inkjet printing technology, an image forming apparatus is well known that discharges ink onto a two-dimensional medium such as a sheet of paper. In recent years, as one application of this technology, there is an inkjet thread printing apparatus (thread dyeing apparatus) that can dye a white thread, which is an elongated one-dimensional medium (linear medium) such as an embroidery thread, on demand.

For example, an embroidery machine with a printing function has been proposed in which an inkjet print head is disposed directly above a thread in order to dye the thread for embroidery. The embroidery machine determines a color for dyeing a print medium from design data and performs multi-color embroidery using the print medium. In the an embroidery machine, during a pause period in which the thread is not dyed, the thread is retracted from the nozzle row and a maintenance-and-recovery operation of nozzles of the print head is performed.

In an inkjet image forming apparatus that discharges ink onto a two-dimensional medium, it is known to perform dummy discharge between one or more jobs (for example, between pages) for maintenance operation during discharge operation.

SUMMARY

According to an embodiment of the present disclosure, there is provided a liquid discharge apparatus that is to be coupled to a post-processing apparatus to perform post-processing using a linear medium such that the post-processing apparatus is disposed downstream from the liquid discharge apparatus in a conveyance direction of the linear medium. The liquid discharge apparatus includes a discharge head, a conveyance mechanism, a head driver, and control circuitry. The discharge head includes a nozzle to discharge droplets onto the linear medium to dye the linear medium. The conveyance mechanism conveys the linear medium in conjunction with the post-processing apparatus. The head driver drives the discharge head in conjunction with conveyance of the linear medium. The control circuitry controls the head driver and determines whether to execute maintenance of the discharge head based on a time required for the post-processing for each dyeing job.

In another embodiment of the present disclosure, there is provided an embroidery system that includes a liquid discharge apparatus, an embroidery apparatus, and control circuitry. The liquid discharge apparatus dyes a thread. The embroidery apparatus performs embroidery on a cloth using the thread fed from the liquid discharge apparatus. The liquid discharge apparatus includes: a discharge head including a nozzle to discharge droplets onto the thread to dye the thread; a conveyor to convey the thread in conjunction with the embroidery apparatus; and a head driver to drive the discharge head in conjunction with conveyance of the thread. The embroidery apparatus includes: a needle; and an embroidery device to perform embroidery on a cloth using the thread passed through the needle. The control circuitry is to calculate a required time of the embroidery for each dyeing job and determine whether to execute maintenance of the discharge head based on the required time. The control circuitry is mounted on the liquid discharge apparatus, the embroidery apparatus, or a host control device that is connectable to the embroidery system.

In still another embodiment of the present disclosure, there is provided a method of controlling a liquid discharge apparatus to be coupled to a post-processing apparatus to perform post-processing using a linear medium such that the post-processing apparatus is disposed downstream from the liquid discharge apparatus in a conveyance direction of the linear medium. The liquid discharge apparatus includes: a discharge head including a dyeing head having a nozzle to discharge droplets onto a linear medium to dye the linear medium; a conveyor to convey the linear medium in conjunction with the post-processing apparatus; and a head driver to drive the discharge head in conjunction with conveyance of the linear medium. The method includes calculating a required time of the post-processing for each dyeing job and determining whether to execute maintenance of the dyeing head based on the required time of the post-processing for each dyeing job.

In still yet another embodiment of the present disclosure, there is provided a non-transitory computer-readable storage medium storing computer-readable program code that, when executed by a computer, cause the computer to execute a process in a liquid discharge apparatus. The liquid discharge apparatus is to be coupled to a post-processing apparatus to perform post-processing using a linear medium such that the post-processing apparatus is disposed downstream from the liquid discharge apparatus in a conveyance direction of the linear medium. The liquid discharge apparatus includes: a discharge head including a dyeing head having a nozzle to discharge droplets onto a linear medium to dye the linear medium; a conveyor to convey the linear medium in conjunction with the post-processing apparatus; and a head driver to drive the discharge head in conjunction with conveyance of the linear medium. The process includes calculating a required time of the post-processing for each dyeing job and determining whether to execute maintenance of the dyeing head based on the required time of the post-processing for each dyeing job.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
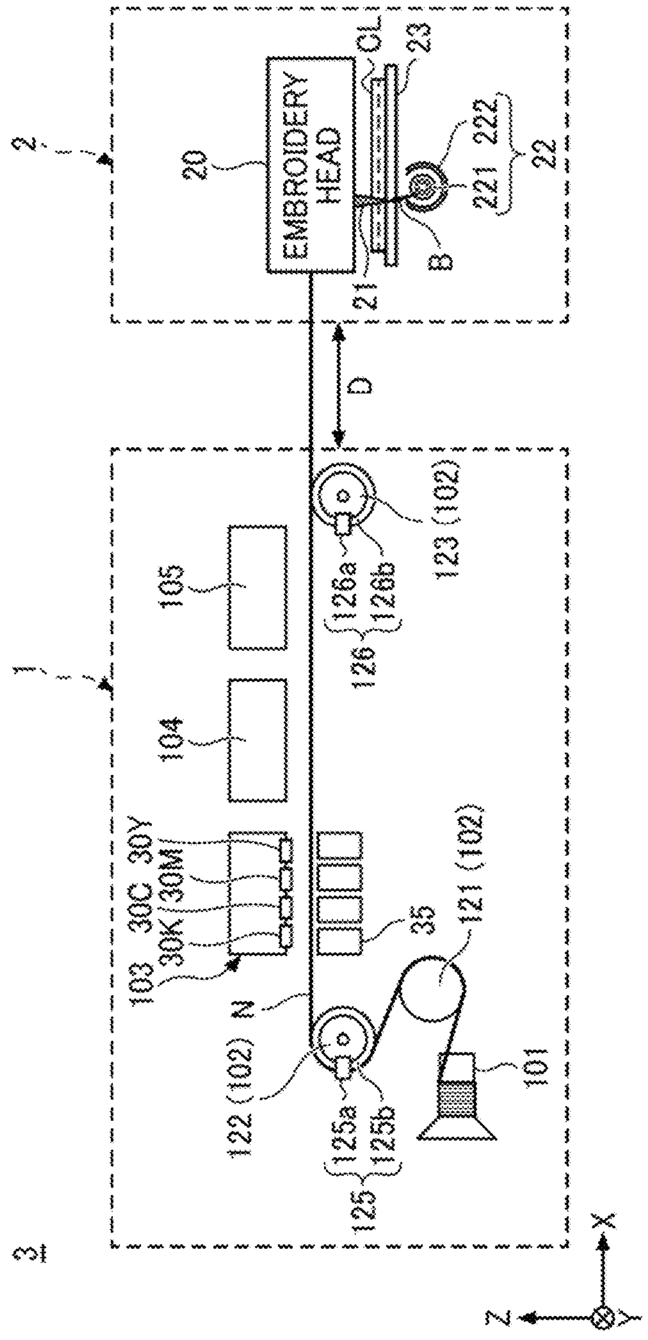
FIG. 1 is a schematic side view of an example of an embroidery system on which a dyeing apparatus according to a first embodiment of the present disclosure is mounted.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given of embodiments of the present disclosure with reference to the drawings. In each drawing below, the same configuration shares the same reference numeral and the overlapped description may be omitted.

Overall Configuration (First Embodiment)

Figure 2:
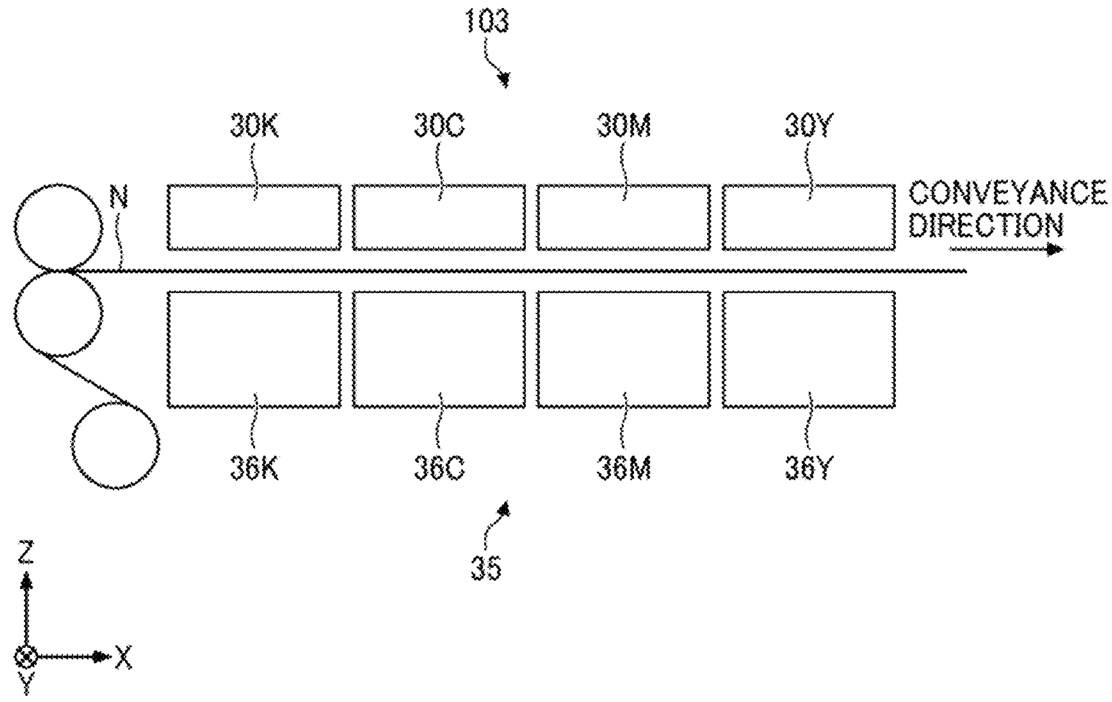
FIG. 2 is a schematic side view of a plurality of discharge heads and a maintenance unit of a dyeing device in a dyeing apparatus according to embodiments of the present disclosure.
Figure 3:
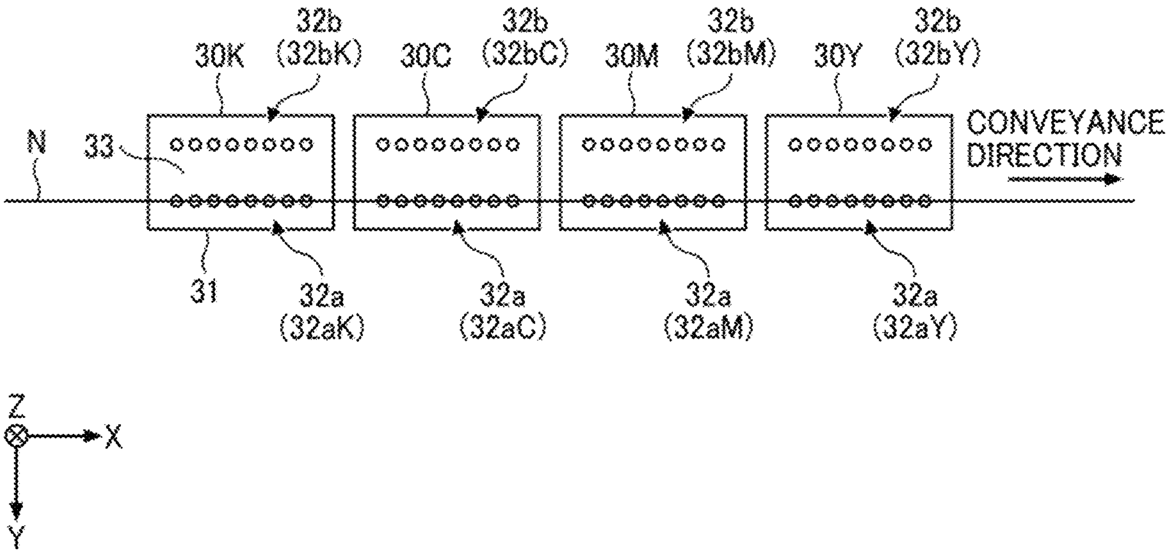
FIG. 3 is a bottom view of a dyeing device according to embodiments of the present disclosure.

First, an embroidery system including a dyeing apparatus according to embodiments of the present disclosure is described with reference to FIGS. 1 to 3. FIG. 1 is a schematic side view of an embroidery system according to a first embodiment of the present disclosure. FIG. 2 is a schematic side view of a dyeing unit and its surrounding part in a dyeing apparatus according to a plurality of embodiments of the present disclosure. FIG. 3 is a bottom view of the dyeing unit in the dyeing apparatus according to the embodiments of the present disclosure.

The embroidery system 3 includes a dyeing apparatus 1 and an embroidery apparatus 2. In the embroidery system 3, the dyeing apparatus 1 is electrically connected to the embroidery apparatus 2 by wired or wireless communication so as to be exchangeable information with the embroidery apparatus 2.

The dyeing apparatus 1 includes an upper-thread spool 101 around which thread N is wound, a dyeing device 103, a fixing device 104, and a post-processing device 105. The dyeing apparatus 1 according to the present embodiment is a liquid discharge apparatus that dyes thread by a liquid discharge method.

The thread N pulled out from the upper-thread spool 101 serving as a supply unit is guided by conveyance rollers 121, 122, and 123 of a conveyance mechanism 102 and continuously routed to the embroidery apparatus 2.

The conveyance roller 122 is provided with a rotary encoder 125. The rotary encoder 125 may be simply referred to as encoder. The rotary encoder 125 includes an encoder wheel 125*b* that rotates together with the conveyance roller 122 and an encoder sensor 125*a* that reads a slit of the encoder wheel 125*b*. Similarly, the conveyance roller 123 is provided with a rotary encoder 126. The rotary encoder 126 includes an encoder sensor 126*a* and an encoder wheel 126*b*.

The dyeing device 103 includes a maintenance mechanism 35. The maintenance mechanism 35 includes a plurality of discharge heads 30 (30K, 30C, 30M, and 30Y) and a plurality of individual maintenance units 36 (36K, 36C, 36M, and 36Y). The plurality of discharge heads 30 (30K, 30C, 30M, and 30Y) discharge and apply liquid of desired colors to the thread N pulled out and fed from the upper-thread spool 101. The plurality of individual maintenance units 36 (36K, 36C, 36M, and 36Y) execute maintenance of the discharge heads 30K, 30C, 30M, and 30Y.

Hereinafter, the direction in which the thread is fed from the dyeing device 103 to the embroidery apparatus 2 is referred to as X, the depth direction of the embroidery system 3 (or the width direction of the thread) is referred to as Y, and the height direction (vertical direction) of the embroidery system 3 is referred to as Z.

With reference to FIG. 2, the plurality of discharge heads 30K, 30C, 30M, and 30Y are liquid applicators and are dying heads that discharge different colors from each other. For example, the discharge head 30K is a dying head that discharges droplets (ink) of black (K), the discharge head 30C is a dying head that discharges droplets of cyan (C), the discharge head 30M is a dying head that discharges droplets of magenta (M), and the discharge head 30Y is a dying head that discharges droplets of yellow (Y). Note that this order of colors is an example and that the colors may be disposed at respective positions different from this description.

The maintenance units 36K, 36C, 36M, and 36Y, respectively, are disposed below the discharge heads 30K, 30C, 30M, and 30Y of the respective colors. As a maintenance recovery operation, the maintenance units 36K, 36C, 36M, and 36Y, for example, cap the discharge heads 30K, 30C, 30M, and 30Y when the discharge heads 30K, 30C, 30M, and 30Y are not in use, receive dummy discharge of droplets from the discharge heads 30K, 30C, 30M, and 30Y, perform suction circulating operation of the nozzles in a state in which a dummy discharge receptacle is close to the discharge heads, and perform a wiping operation of the nozzles.

Here, as illustrated in FIG. 3, each of the discharge heads 30K, 30C, 30M, and 30Y has a nozzle surface 33 on which nozzle rows 32*a* and 32*b* are formed. A plurality of nozzles 31 for discharging liquid droplets are arranged in each of the nozzle rows 32*a* and 32*b*. In each of the discharge heads 30K, 30C, 30M, and 30Y, the direction of each of the nozzle rows 32*a* and 32*b*, which are arrays of the nozzles 31, is arranged to be parallel to the conveyance direction of the thread N.

In the discharge head 30K, ink droplets discharged from the nozzles 31 of one row (e.g., the nozzle row 32*a* in FIG. 3) positioned directly below the thread N land on the thread N to color (also referred to as dye or print) the thread N. FIG. 3 illustrates an example in which the discharge head 30K has two nozzle rows, i. e., the two nozzle rows 32*a* and 32*b*, on the nozzle surface 33. However, the number of nozzle rows in the discharge head 30K may be one, or three or more. As illustrated in FIG. 3, the other discharge heads 30C, 30M, and 30Y also have similar configurations to the discharge head 30K.

With reference to FIG. 1, the fixing device 104 performs a fixing process (drying process) on the thread N to which the liquid discharged from the dyeing device 103 is applied. The fixing device 104 includes, for example, a heater such as an infrared irradiation device and a hot air sprayer, and heats the thread N to dry.

The post-processing device 105 includes, for example, a cleaner that cleans the thread N, a tension adjuster that adjusts the tension of the thread N, a feed amount detector that detects the amount of movement of the thread N, and a lubricant applicator that lubricates the surface of the thread N.

Note that the dyeing apparatus 1 according to an embodiment of the present disclosure includes at least the conveyance mechanism 102 and the dyeing device 103 that applies a colored liquid to the thread N and may not include the fixing device 104 and the post-processing device 105.

The embroidery apparatus 2 illustrated in FIG. 1 includes a needle 21, a lower-thread rotator 22, a stage 23, and an embroidery head 20.

In the needle 21, an upper thread N is passed through a needle hole at the needle tip. The needle 21 is vertically movable with respect to a cloth C. Note that cloth such as the cloth C may be in the form of a sheet such as a chemical fiber.

The lower-thread rotator 22 includes a lower-thread bobbin 221 around which lower thread B is wound and a hook 222. The lower-thread bobbin 221 and the hook 222 rotate in conjunction with the movement of the needle 21. The lower-thread rotator 22 also includes, for example, a cylindrical inner shuttle that accommodates the lower-thread bobbin 221, a bottomed cylindrical outer shuttle, and a cylindrical case integrated with the hook 222. FIG. 1 illustrates an example in which the lower-thread bobbin 221 is of a vertical rotation type (a vertical full-rotary shuttle type or a vertical half-rotary shuttle type) in which the rotation direction is the vertical direction. In some embodiments, the lower-thread bobbin 221 may be of a horizontal rotation type (a horizontal shuttle type) in which the rotation direction is the horizontal direction.

The stage 23 is a table for holding the cloth C and has a hole through which the needle 21 passes. The stage 23 is movable in the X direction and the Y direction to feed the cloth C.

The embroidery head 20 serving as an embroidery device is provided with a computing mechanism 25 (see FIG. 7) and controls the movement (handling) of the needle 21 through which the upper thread N passes and the movement of the stage 23 to embroider the cloth C using the upper thread N and the lower thread B fed in accordance with the feeding of the upper thread N. Thus, an embroidery pattern is formed on the cloth C.

Also note that the term "thread" includes glass fiber thread; wool thread; cotton thread; synthetic fiber thread; metallic thread; mixed thread of wool, cotton, polymer, or metal; and linear object (linear member or continuous base material) to which thread, filament, or liquid is applied. The term "thread" also includes braided cord and flatly braided cord.

Maintenance Mechanism of First Configuration Example

Next, a mechanism related to maintenance of the dyeing device 103 according to a first configuration example of the present disclosure is described with reference to FIGS. 4 to 6. FIG. 4 is a diagram illustrating movement of the discharge head 30K in a direction orthogonal to the conveyance direction of thread in the dyeing device 103 according to the first configuration example of the present disclosure. FIG. 5 is a schematic bottom diagram illustrating movement of the discharge head 30K in the direction orthogonal to the conveyance direction of thread in the dyeing device 103 according to the first configuration example of the present disclosure.

Figures 4A, 4B, 4C:
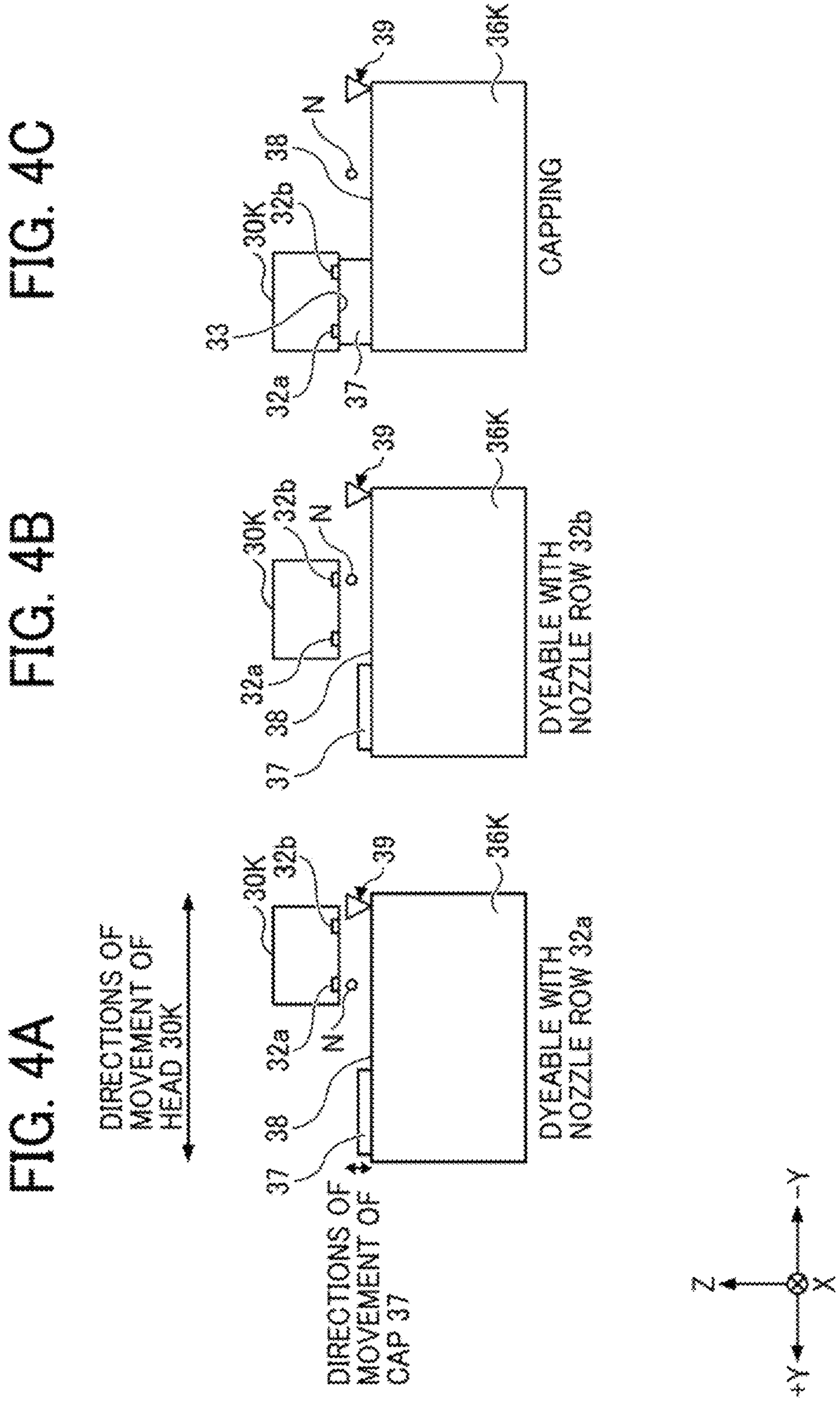
FIGS. 4A, 4B, and 4C are diagrams illustrating movement of a discharge head in a direction orthogonal to a conveyance direction of thread in a dyeing device of a dyeing apparatus according to a first configuration example of the present disclosure, viewed from the direction orthogonal to the conveyance direction.
Figure 5:
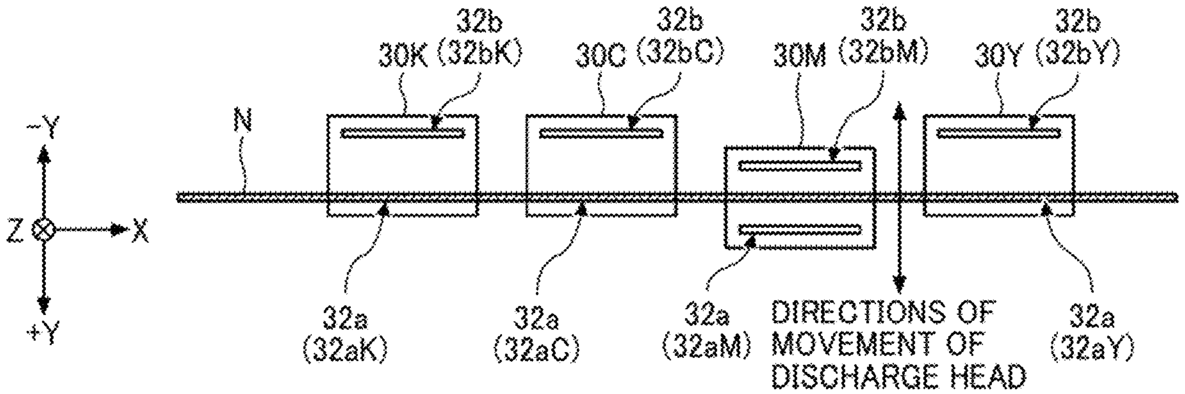
FIG. 5 is a schematic bottom view of the discharge head in the dyeing device of the dyeing apparatus according to the first configuration example of the present disclosure, illustrating movement of the discharge head in directions orthogonal to the conveyance direction of the thread.

Specifically, FIG. 4A illustrates the position of the discharge head 30K in a state where droplets can be discharged from the nozzle row 32*a* onto the thread N, that is, in a state where dyeing can be performed by the nozzle row 32*a*. FIG. 4B illustrates the position of the discharge head 30K in a state where droplets can be discharged from the nozzle row 32*b* onto the thread N (dyeing can be performed). FIG. 4C illustrates the position of the discharge head 30K in a state where the nozzle rows 32*a* and 32*b* are capped with a cap 37.

As illustrated in FIGS. 4 and 5, when the discharge head 30K moves in the direction orthogonal to the conveyance direction of the thread N, the nozzle row 32*a* can be dyed (colored), the nozzle row 32*b* can be dyed, and the nozzle surface 33 can be capped with the cap 37. The moving direction Y of the discharge head 30K is the depth direction of the dying apparatus 1 illustrated in FIG. 1.

Similarly, the other discharge heads 30C, 30M, and 30Y can freely move in the head movement direction to select a nozzle row to be used and perform a maintenance operation.

In addition, as illustrated in FIGS. 3, 4, and 5, two nozzle rows 32*a* and 32*b* are provided on the lower surface of the discharge head 30K. The discharge head 30K is moved such that the nozzle row for printing the thread by landing ink droplets on the thread is set to be positioned directly above the thread. Thus, the nozzle row to be used can be appropriately selected.

The maintenance unit 36K performs capping to engage the cap 37 with the head 30K and also collects ink, which protrudes from thread N or is dummy-discharged and does not land on the thread N, on a collection surface 38 that is an upper surface on which the cap 37 is not disposed. In the first configuration example, the collection surface 38 functions as a dummy discharge receiver that receives dummy discharge droplets discharged for purposes other than dyeing the thread N.

A home position (HP) sensor 39 is disposed in the maintenance unit 36K as a reference for movement of the discharge head 30K. FIG. 4 depicts an example in which the HP sensor 39 that defines the position of the home position of the discharge head 30K is disposed at an end of the maintenance unit 36K. In some embodiments, the HP sensor 39 may be disposed at any other suitable position in the head movement direction.

In addition, as illustrated in FIG. 5, the positions of the plurality of discharge heads 30K, 30C, 30M, and 30Y are separately movable in the ±Y direction.

Here, a mechanism that moves each of the discharge heads 30K, 30C, 30M, and 30Y in the head movement direction (apparatus depth direction) is described with reference to FIG. 6. FIG. 6 is a schematic view of a head mover of the dyeing device 103 and a mover of the cap 37 on the maintenance unit 36K.

Figure 6:
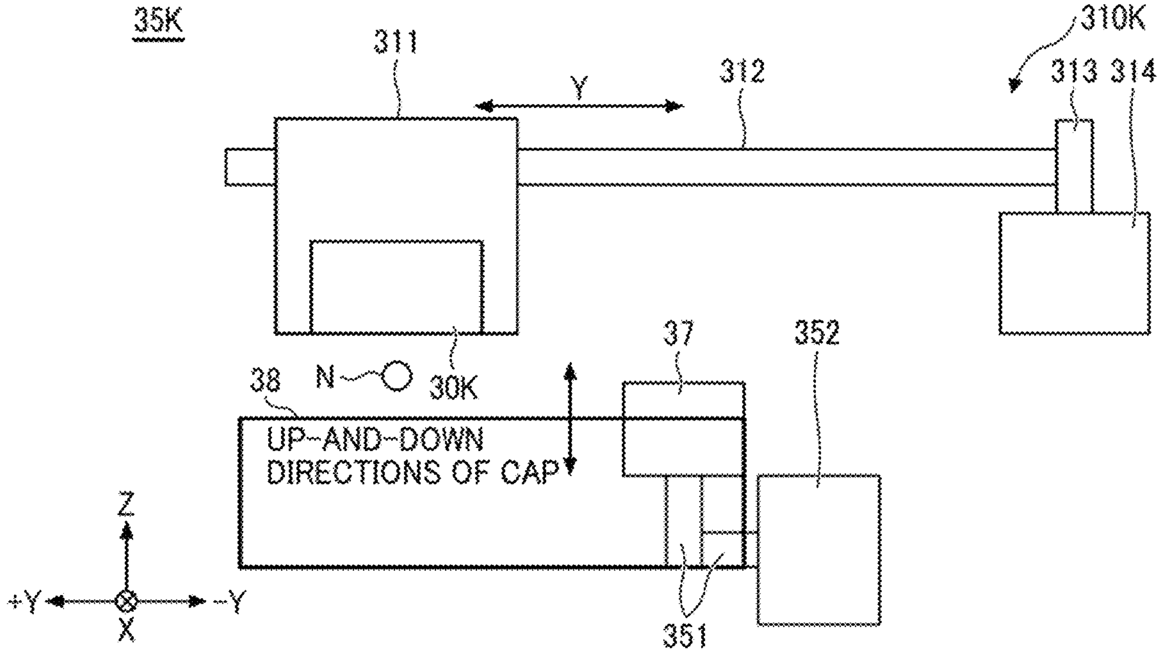
FIG. 6 is a schematic view of a head mover of the dyeing device and a mover of a cap of a maintenance unit, according to the first configuration example of the present disclosure.

As illustrated in FIG. 6, the discharge head 30K is supported by a movable carriage 311. A head moving motor 314 moves arms 312 and 313 supporting the carriage 311, thus allowing the carriage 311 to move in a movable direction. As an example of the head movement, for example, the arm 312 itself extending in the horizontal direction may expand and contract, or the carriage 311 may be moved by changing the position of the carriage 311 with respect to the arm 312. In this configuration example, the carriage 311, the arms 312 and 313, and a head moving motor 314 are collectively referred to as a head mover (head moving unit) 310.

Such a structure allows the discharge head 30K supported by the carriage 311 to be moved to the position of the cap 37 during standby, be moved to the position of the thread N during dyeing, and be moved to a position facing the collection surface (dummy discharge receiver) 38 during dummy discharge.

The head mover 310, which is a movable unit that moves the position of the discharge head 30K, is preferably provided for each head. Thus, the timing of performing maintenance such as dummy discharge for each head can be changed.

In the maintenance unit 36K, the cap 37 can be lifted up and down by a lifting arm 351. The lifting arm 351 is driven by a cap lifting motor 352. During standby, in order to prevent drying of ink on the discharge head 30K, as illustrated in FIG. 4C, the cap 37 is raised to cap the discharge head 30K. During dyeing, as illustrated in FIGS. 4A and 4B, the cap 37 is lowered for decapping.

In the first configuration example, the maintenance unit 36K including the lifting arm 351, the cap lifting motor 352, the cap 37, the collection surface 38, and the HP sensor 39 and the head mover 310K function as a maintenance mechanism 35K for the discharge head 30K.

Although FIG. 4 illustrates the example in which the cap 37 is disposed on the back side (+Y side) of the embroidery system 3 in the maintenance unit 36K, the cap 37 may be disposed on the front side (−Y side) of the embroidery system 3 in the maintenance unit 36K as illustrated in FIG. 6.

Control Block

Figure 7:
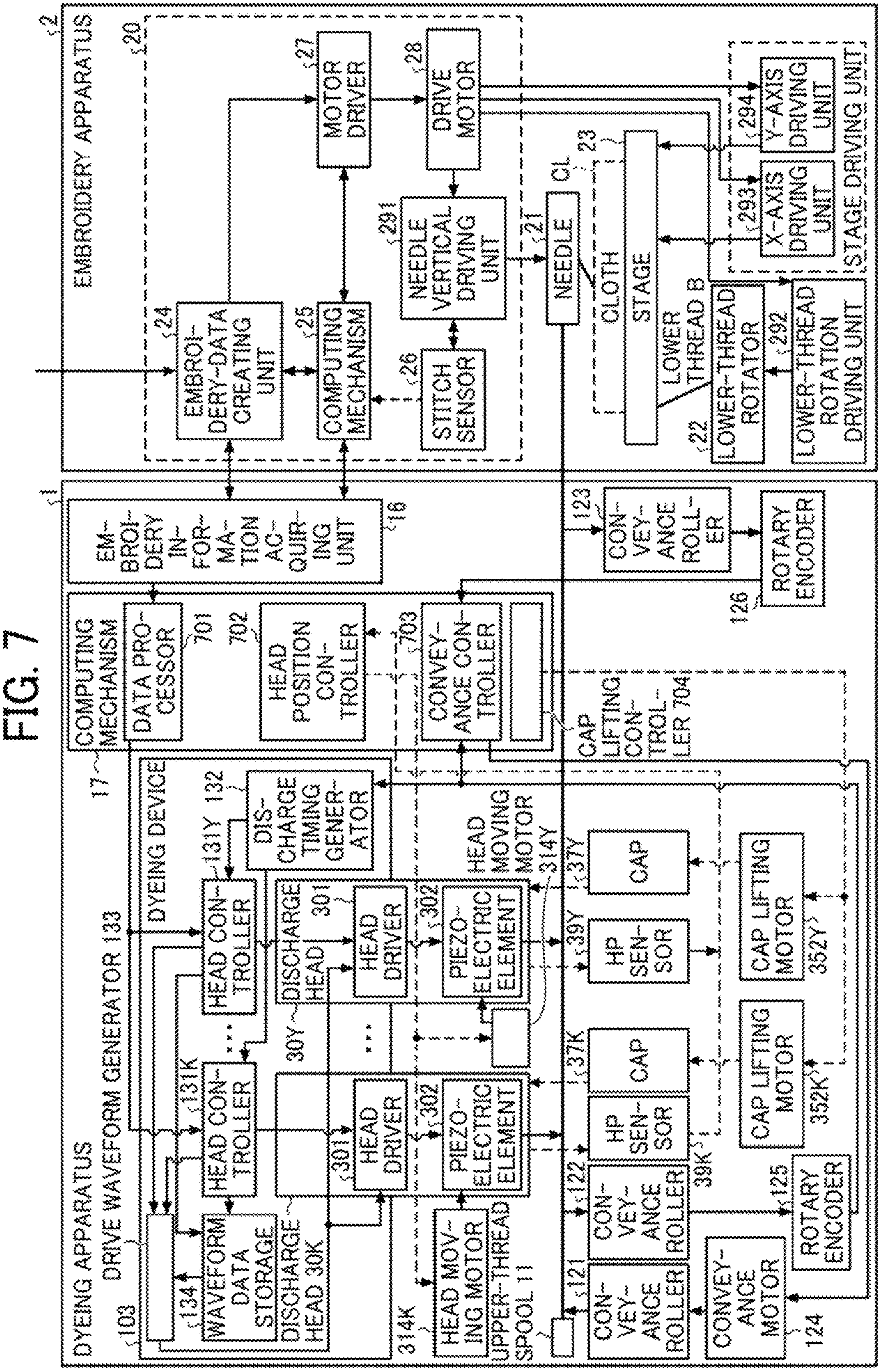
FIG. 7 is a schematic block diagram of a section related to drive control of the embroidery system according to the first embodiment of the present disclosure.

FIG. 7 is a schematic block diagram of a section related to drive control of the embroidery system according to the first embodiment of the present disclosure.

In embodiments of the present disclosure, a dyeing job executed on the dyeing apparatus side is an operation based on a thread dyeing instruction associated with an embroidery original (embroidery image), and the time of dyeing operation is defined according to the time of embroidery operation. Therefore, the drive control of the embroidery apparatus 2 is described first.

As illustrated in FIG. 7, the embroidery apparatus 2 includes an embroidery-data creating unit 24, the computing mechanism 25, a motor driver 27, a drive motor 28, a needle vertical driving unit 291, a lower-thread rotation driving unit 292, an X-axis driving unit 293, and a Y-axis driving unit 294 that serve as a section related to drive control, which is not illustrated in FIG. 1. A stitch sensor 26 may also be provided. At least the motor driver 27, the drive motor 28, the needle vertical driving unit 291, and the stitch sensor 26 are built in the embroidery head 20 above the needle 21. Further, as indicated by a dotted line, the embroidery-data creating unit 24 and the computing mechanism 25 may also be built in the embroidery head 20.

The embroidery-data creating unit 24 acquires an embroidery image, which is also referred to as embroidery file or embroidery original, from which the embroidery data is generated, creates the embroidery data based on the embroidery image, and outputs the embroidery data to the computing mechanism 25 and the motor driver 27. The embroidery data is original data in which data of coordinates for moving the needle and what to do at the position coordinates are paired.

The computing mechanism 25 calls the number of stitches corresponding to a present position from the motor driver 27 driven base on the embroidery data, grasps the present position, calculates an estimated consumption amount of an upper thread from the present position to the embroidery data, and divides the time taken from the estimated consumption amount to calculate information on the linear velocity of thread (hereinafter, thread linear-velocity information).

Alternatively, the stitch sensor 26 may be provided so that the number of stitches can be acquired more easily in the computing mechanism 25. The stitch sensor 26 is a sensor that detects the vertical movement of the needle 21 and is provided, for example, on a needle bar that holds the needle 21. The stitch sensor 26 detects the number of stitches corresponding to how many times the needle 21 has moved up and down, that is, how many stitches have been advanced by the needle 21. In this case, the thread linear-velocity information is calculated based on the number of stitches and the embroidery data.

The motor driver 27 drives and controls the drive motor 28 based on the embroidery data. The progress status in the embroidery data is notified to the computing mechanism 25.

The needle vertical driving unit 291 is also referred to as a balance and converts the rotational movement of an upper shaft coupled to the drive motor 28 into the vertical movement to drive the up-and-down movement of the needle 21 through which the upper thread N is passed.

The lower-thread rotation driving unit 292 rotates the lower-thread rotator 22 in conjunction with the vertical movement of the needle 21 by the rotational movement of a lower shaft coupled to the upper shaft via, for example, a belt, a cam, and a crank.

The X-axis driving unit 293 and the Y-axis driving unit 294 are stage movement drive units serving as cloth feeders and drive the movement of the stage 23, on which the cloth C is placed, in the X direction and the Y direction in conjunction with the vertical movement of the needle 21 and the rotation of the lower-thread rotator 22 by the rotational movement of the lower shaft. The cloth C may be fed by moving the entire stage 23 or by moving a feed dog provided on the hole of the stage 23.

The needle vertical driving unit 291, the lower-thread rotation driving unit 292, the X-axis driving unit 293, and the Y-axis driving unit 294 serve as a drive mechanism that is driven in conjunction with one drive motor 28. Accordingly, the vertical movement of the needle 21, the rotational movement of the lower-thread rotator 22, and the X-and-Y movement of the cloth C on the stage 23 are generated by the rotation of the drive motor 28. For example, one vertical movement of the needle 21 is performed in conjunction with one or an integral number of rotational movements of the lower-thread rotator 22.

On the other hand, as illustrated in FIG. 7, the dyeing apparatus 1 includes an embroidery information acquiring unit 16 and a computing mechanism 17 as portions related to drive control. In FIG. 7, the fixing device 104 and the post-processing device 105 are not illustrated. In addition, although only two discharge heads 30K and 30Y and portions related to discharge driving thereof are illustrated in the dyeing device 103, the discharge heads 30M and 30C also have a similar, even if not the same, driving configuration.

The embroidery information acquiring unit 16 exchanges information with the embroidery apparatus 2 and acquires, for example, an embroidery image, an embroidery job, embroidery data, the number of stitches, and thread linear-velocity information from the embroidery apparatus 2.

The computing mechanism 17 includes a data processor 701, a head position controller 702, a conveyance controller 703, and a cap lifting controller 704.

The dyeing device 103 includes head controllers 131K, 131C, 131M, and 131Y that control the discharge heads 30K, 30C, 30M, and 30Y, respectively, a discharge timing generator 132 that generates discharge timing, a drive waveform generator 133, and a waveform data storage 134 that serve as a drive mechanism.

The discharge head 30K includes a head driver 301 serving as a head driving unit and a plurality of piezoelectric elements 302 serving as pressure-generating elements that generate pressure for discharging liquid from the plurality of nozzles 31.

The head controllers 131K, 131C, 131M, and 131Y, the discharge timing generator 132, the drive waveform generator 133, the waveform data storage 134, and the head driver 301 serve as a drive waveform application unit that applies drive waveforms to the piezoelectric elements 302 of the discharge heads 30K, 30C, 30M, and 30Y.

In addition, for example, a conveyance controller 703, an upstream rotary encoder 125, an embroidery-head rotary encoder 126, and a conveyance motor 124 are provided as a conveyance control unit.

The head position control unit includes a head position controller 702, and head moving motors 314K, 314C, 314M, and 314Y and HP sensors 39K, 39C, 39M, and 39Y that are provided for the discharge heads 30K. 30C, 30M, and 30Y of the respective colors.

Here, the thread N is conveyed (fed) as the thread N is consumed by the embroidery operation by the embroidery head 20 of the embroidery apparatus 2 on the downstream side. The rotary encoder 126 on the downstream side of the embroidery head 20 is a feed amount detector that detects the amount of movement of the thread N in the embroidery head 20.

The conveyance controller 703 is an example of the conveyance control unit, determines the conveyance speed of the thread N based on the movement amount of the rotary encoder 126 on the downstream side, and rotates the conveyance roller 121 on the upstream side by the conveyance motor 124 to convey the thread N at the determined conveyance speed. Further, the speed is detected with a rotary encoder 125 located upstream from the dyeing device 103 in the thread conveyance direction, and the thread conveyance of the conveyance motor 124 is controlled.

As the thread N is fed, the conveyance roller 122 guiding the thread N rotates to rotate the encoder wheel 125*b* of the rotary encoder 125. The encoder sensor 125*a* generates and outputs an encoder pulse proportional to the linear velocity of the thread N.

The discharge timing generator 132 generates a discharge timing pulse stb based on the encoder pulse from the rotary encoder 125 and outputs the discharge timing pulse stb to the head controller 131. The discharge timing pulse stb is used as the discharge timing of the discharge heads 30K, 30C, 30M, and 30Y. The ink droplets are discharged onto the thread N from the start of the movement of the thread N. Even if the linear velocity of the thread N changes, the intervals of the discharge timing pulses change in accordance with the encoder pulses of the rotary encoder 125, thus preventing the landing positions of the droplets from shifting.

The head controllers 131K, 131C, 131M, and 131Y receive dyeing data and maintenance data from the data processor 701 and output drive signals to the head drivers 301 of the respective discharge heads 30K, 30C, 30M, and 30Y based on discharge data including the dyeing data and the maintenance data. Furthermore, when receiving the discharge timing pulses, the head controllers 131K, 131C, 131M, and 131Y also output the drive pulses to the drive waveform generator 133.

The drive waveform generator 133 calls a drive waveform stored in the waveform data storage 134 and outputs the drive waveform to each head driver 301 at a timing synchronized with the discharge timing pulse.

The head drivers 301 select droplet sizes of ink droplets based on the input drive waveforms and drive signals, and drive the discharge heads 30K, 30C, 30M, and 30Y such that ink is discharged from the nozzles 31 of the discharge heads 30K, 30C, 30M, and 30Y to the thread N being fed at timings corresponding to the fed speed.

The head position controller 702 is an example of a head position controller, and rotates the head moving motors 314K, 314C, 314M, and 314Y based on head position commands from the head controllers 131K, 131C, 131M, and 131Y to move the discharge heads 30K, 30C, 30M, and 30Y to predetermined positions at respective timings.

For example, when the head moving motors 314K, 314C, 314M, and 314Y are stepper motors, position control is performed by rotating the head moving motors 314K, 314C, 314M, and 314Y from a state in which the home position (HP) is detected by the HP sensors 39K, 39C, 39M, and 39Y, to a target position such as the coloring position in the nozzle row 32*a*, the coloring position in the nozzle row 32*b*, or the capping position, by the number of steps of the stepper motors corresponding to the distance from the IP to the target position. The head position controller 702 notifies the head controllers 131K, 131C, 131M, and 131Y that the head movement has been completed after the rotation by the number of steps corresponding to the distance is performed.

A cap lifting controller 704 rotates the cap lifting motors 352K, 352C, 352M, and 352Y to lift and lower the caps 37K, 37C, 37M, and 37Y, based on the capping and decapping instructions from the head controllers 131K, 131C, 131M, and 131Y.

For example, when cap lifting motors 352K, 352C, 352M, and 352Y are stepper motors, the cap lifting controller 704 controls the cap lifting motors 352K, 352C, 352M, and 352Y to rotate by the number of steps corresponding to the distance between the capping position as the upper end and the decapping position as the lower end. After rotating the cap lifting motors 352K, 352C, 352M, and 352Y by the number of steps corresponding to the distance from the upper end to the lower end, the cap lifting controller 704 notifies the head controllers 131K, 131C, 131M, and 131Y that capping or decapping of the nozzle row by lifting up or down of the caps 37K, 37C, 37M, and 37Y has been completed.

Print Job and Dyeing Job and Required Times

Figure 8A:
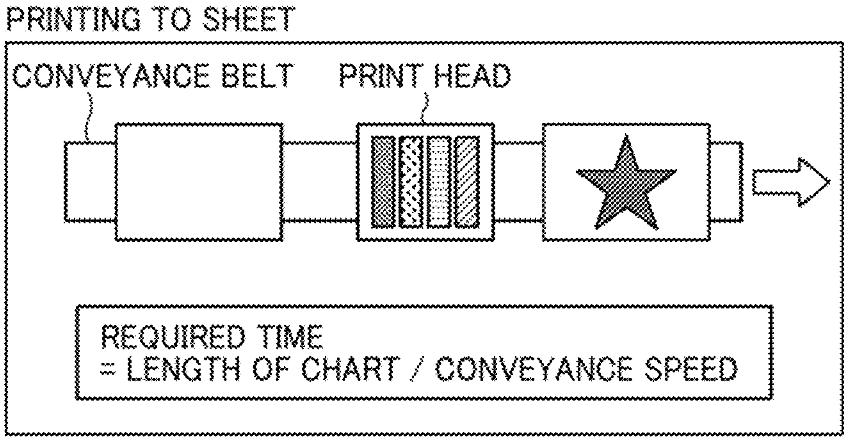
FIGS. 8A and 8B are diagrams illustrating required times corresponding to jobs of an image forming operation and an embroidery operation.
Figure 8B:
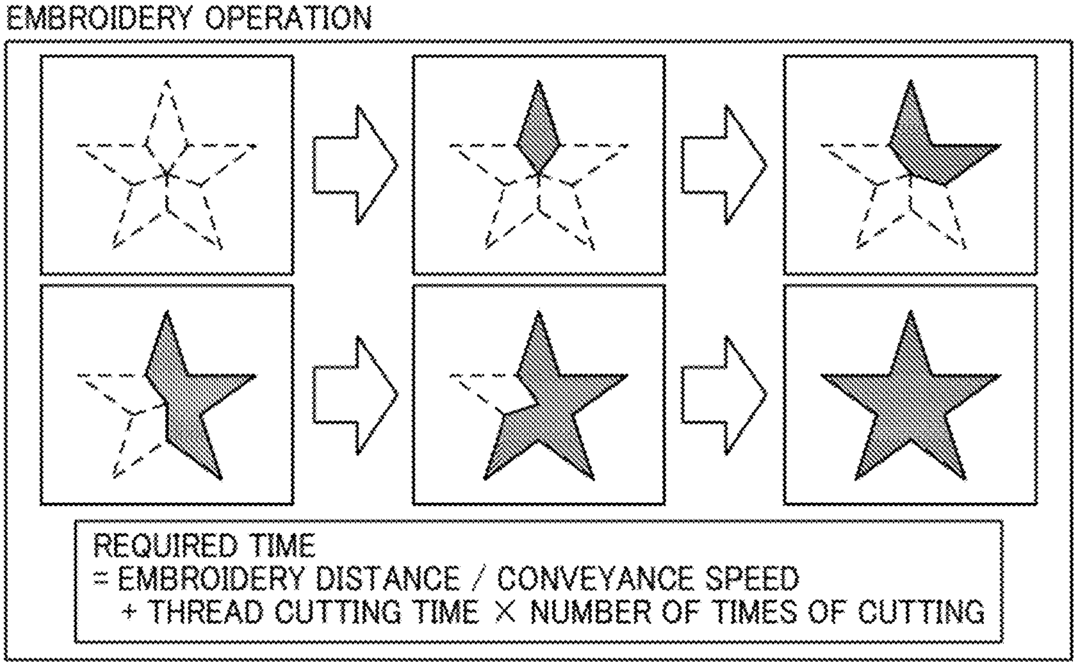

Here, the required time corresponding to a job is described with reference to FIGS. 8A and 8B. FIG. 8A is a diagram illustrating a required time in a line-head-type image forming apparatus in which a sheet of paper is an object onto which ink is to be discharged. FIG. 8B is a diagram illustrating a required time in an embroidery operation using a thread.

As a comparative example, in a general line-head inkjet image forming apparatus as illustrated in FIG. 8A, a medium (two-dimensional medium) having a relatively large two-dimensional spread such as a sheet of paper is set as an object onto which droplets are to be discharged (an object to be printed). In such an apparatus, the time required for printing is determined by two factors: the size of print job and the conveyance time.

Here, the print job on the two-dimensional medium refers to an operation based on a drawing instruction such as copying, facsimile, or scanning performed once by the user. For example, the print job includes a drawing instruction including information on the number of pages and the number of copies of sheets of paper to be printed.

Job

On the other hand, in a dyeing apparatus for thread, an elongated medium (linear medium or one-dimensional medium) having a relatively small two-dimensional spread, such as thread, is set as an object onto which droplets are to be discharged (an object to be dyed). The dying apparatus is assumed to, for example, dye a white thread such as an embroidery thread on demand and be used in conjunction with an embroidery apparatus serving as a post-processing apparatus. In a case where the post-processing apparatus is an embroidery apparatus (embroidery machine), the dyeing apparatus provided on the upstream side of the embroidery apparatus is largely affected by the conveyance of the thread in the embroidery apparatus. Note that the post-processing apparatus used herein is an apparatus that performs post-processing on a linear medium.

The time required for the embroidery operation in the embroidery apparatus illustrated in FIG. 8B is determined by the embroidery distance, the embroidery speed, the thread cutting time, and the number of times of thread cutting. The embroidery distance varies due to the influence of the path through which the needle passes and the thickness of the cloth. Therefore, the dyeing of the thread is more complicated than the printing on the two-dimensional medium, and the time per dyeing job associated with one embroidery operation is also longer.

Here, the dyeing job for the thread tone-dimensional medium) of the present disclosure refers to an operation based on a thread dyeing instruction associated with an embroidery original (embroidery image) performed once by a user. That is, one dyeing job is an operation based on a thread dyeing instruction associated with one embroidery original. For example, the dyeing job includes a thread dyeing instruction including information on a dyeing length of a thread in dyeing data created in association with an embroidery original.

For example, in the example of FIG. 8B, embroidery is executed on live regions into which a star shape (five pointed star) is divided. For example, when the five regions included in the star shape of FIG. 8B are painted with different colors, for example, first the edge of one region is trimmed with running stitches, undersewing is performed to maintain tension in the region, and the undersewn surface is embroidered with pattern sewing (satin stitches) to fill the undersewn surface. Thus, an embroidery pattern of each region is completed. The embroidery-pattern forming operation for each area is repeated five times to complete the star-shaped embroidery pattern on the cloth. Note that the above-described embroidery procedure is an example, and for example, the undersewing may be omitted. Alternatively, the edging may be collectively performed before formation of the first region and may not be performed in the process for each region.

In the star-shaped embroidery pattern illustrated in FIG. 8B, each of the divided regions is an “embroidery job”, and one entire star is an “embroidery job group”. For example, when a plurality of such star patterns are provided on the cloth at intervals, there are a plurality of embroidery job groups.

Maintenance Execution Timing

Figures 9A, 9B, 9C:
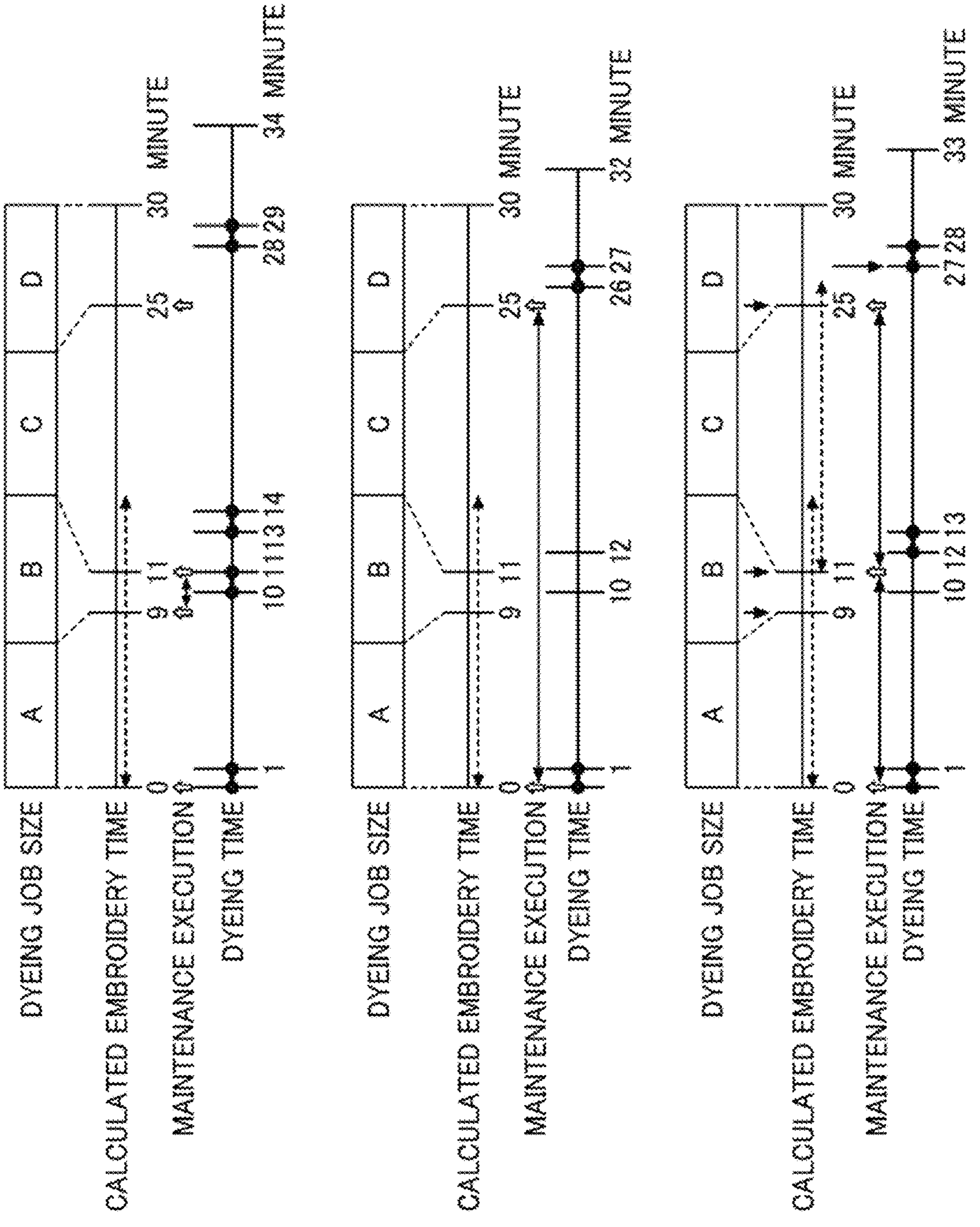
FIGS. 9A, 9B, and 9C are diagrams illustrating examples of embroidery time and dyeing time corresponding to a dyeing job and execution timing of maintenance.

FIGS. 9A, 9B, and 9C are diagrams illustrating examples of the embroidery time and dyeing time corresponding to dyeing job and the execution timing of maintenance. In each of FIGS. 9A, 9B, and 9C, the upper part represents the dyeing job size, the middle part represents the embroidery time, and the lower part represents the dyeing time.

In any of the examples, dyeing jobs A, B, C, and D have the same dyeing job size but different times required for embroidery. For example, the same dyeing job size means that the dyeing lengths of threads by dyeing jobs are equal. Therefore, when the dyeing jobs A, B, C, and D are executed in FIGS. 9A, 9B, and 9C, the dyeing lengths on the thread N are equal. The series of dyeing jobs A, B, C, and D are combined into one dyeing job group.

On the other hand, in the examples of FIGS. 9A, 9B, and 9C, the embroidery time (required time for embroidery or calculated embroidery time) of the embroidery apparatus 2 in the dyeing job A is nine minutes, the embroidery time in the dyeing job B is two minutes, the embroidery time in the dyeing job C is 14 minutes, and the embroidery time in the dyeing job D is five minutes.

For example, in the embroidery operation corresponding to the embroidery data created based on the embroidery original, as the stitch length (stitch width) per stitch is longer, the stitch density is lower, and the number of times of thread cutting is smaller, the consumption speed of the thread is faster and therefore the required time of the embroidery is shorter as in the dyeing job B. On the other hand, as the stitch length per stitch is shorter, the stitch density is higher, and the number of times of thread cutting is larger, the consumption speed of the thread becomes lower and therefore the required time of the embroidery is longer as in the dyeing job C.

The dyeing time in the dyeing apparatus 1 illustrated in the lower part is the sum of the dyeing execution time, which is associated with the embroidery time, and the maintenance time.

FIG. 9A illustrates the maintenance execution timing of a discharge head in Comparative Example 1. FIG. 9B illustrates the maintenance execution timing of a discharge head in Comparative Example 2. FIG. 9C illustrates the maintenance execution timing of a discharge head according to the present embodiment.

FIG. 9A illustrates, as Comparative Example 1, control for performing maintenance between all dyeing jobs, simulating maintenance that is often performed in a typical inkjet image forming apparatus for two-dimensional media. In the case of this control, since maintenance is frequently performed, a discharge abnormality is unlikely to occur. However, since the maintenance is performed between the dyeing jobs even in a place where the interval is short (here, after two minutes at the shortest), it takes much dyeing time until all jobs are completed as illustrated in the lower part of FIG. 9A.

FIG. 9B illustrates, as Comparative Example 2, control in which maintenance is performed when an elapsed time from the previous maintenance execution time exceeds a set time. When the set time is 15 minutes in this example, the dyeing time until the end of the embroidery job is shortened due to the reduction in the number of times of maintenance. However, since the maintenance is not performed for 25 minutes at the maximum, the deviation from the set time of 15 minutes is large, and thus the discharge abnormality is likely to occur.

In order to solve this disadvantage, the present embodiment illustrated in FIG. 9C employs, in consideration of the embroidery time, a control method in which maintenance is performed at the end of the current job if the embroidery time exceeds a set time at the end of the next job.

For example, in the case where the set time is 15 minutes, at the end time of the dyeing job A, the total required time for embroidery from the previous maintenance execution timing, which is the previous maintenance end time, to the end time of the next dyeing job B does not exceed the set time of 15 minutes since the total time of the dyeing jobs A and B is 11 minutes. Therefore, maintenance is not executed.

At the end of the dyeing job B, the total required time for embroidering from the previous maintenance execution timing to the end of the next dyeing job C exceeds the set time of 15 minutes since the total time of the dyeing jobs A, B, and C is 25 minutes. Therefore, maintenance is executed.

At the end of the dyeing job C, the total required time for embroidery from the previous maintenance execution timing to the end of the next dyeing job C exceeds the set time of 15 minutes since the total time of the dyeing jobs C and D is 19 minutes. Therefore, maintenance is executed.

As described above, in the control illustrated in FIG. 9C, the minimum time and the maximum time of the maintenance intervals are 11 minutes and 19 minutes, respectively, which do not greatly deviate from the set time of 15 minutes. Therefore, it can be said that the maintenance can be executed at appropriate timings.

Functional Block Diagram

Figure 10:
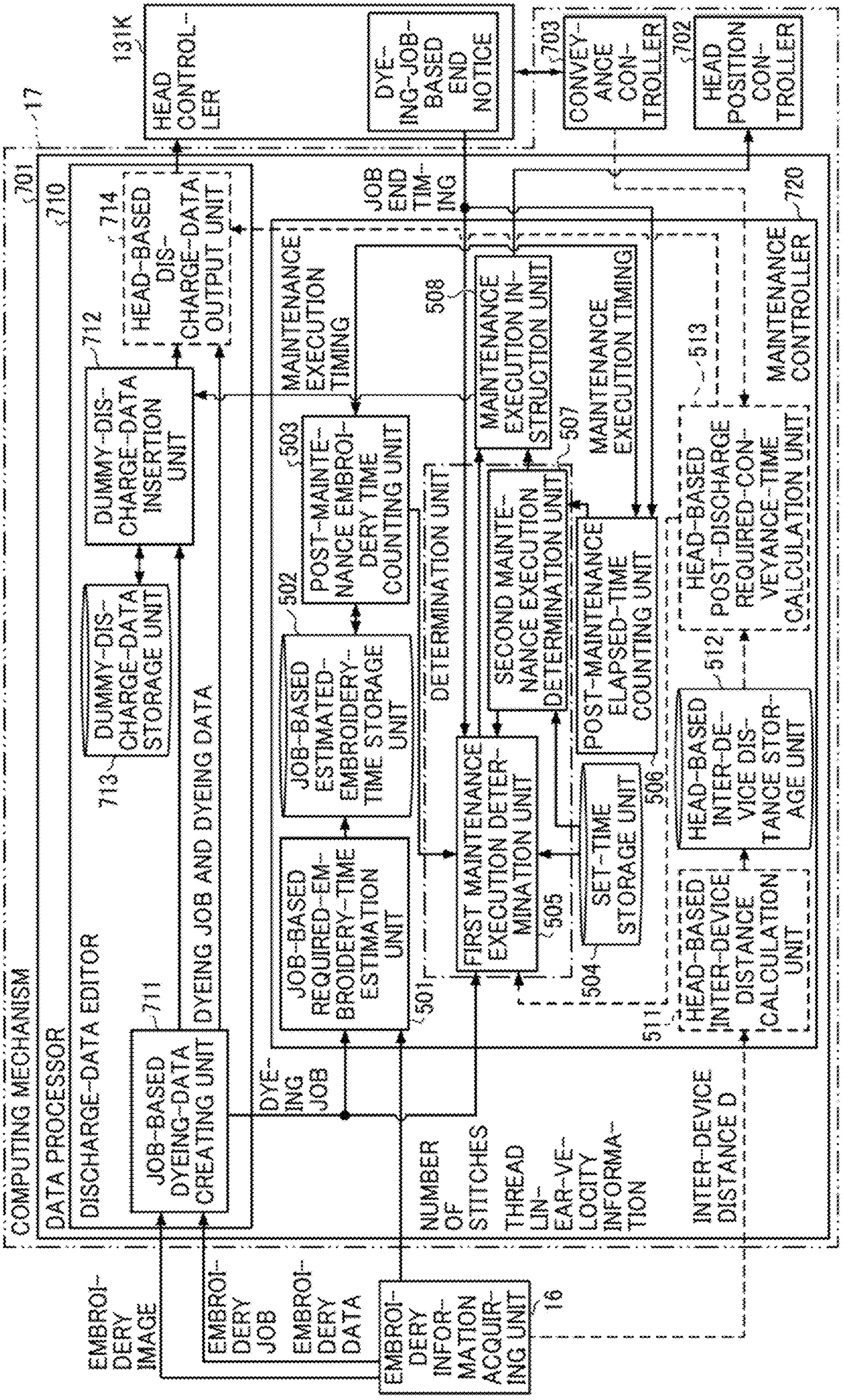
FIG. 10 is a functional block diagram of a section related to discharge and maintenance control according to the first embodiment.

FIG. 10 is a functional block diagram of a section related to maintenance control according to an embodiment of the present disclosure. In FIG. 10, the head controller 131K is described as an example. A control instruction similar to that of the head controller 131K is also transmitted to the head controllers 131M, 131C, and 131Y.

The data processor 701 includes a discharge-data editor 710 and a maintenance controller 720 in an executable manner.

The discharge-data editor 710 includes a job-based dyeing-data creating unit 711, a dummy-discharge-data insertion unit 712, a dummy-discharge-data storage unit 713, and a head-based discharge-data output unit 714. The discharge-data editor 710 creates dyeing data based on the embroidery image and outputs, to the head controller 131K, discharge data in which maintenance data is inserted between dyeing jobs to be executed based on an embroidery image, depending on the case.

The job-based dyeing-data creating unit 711 defines a dyeing job to be executed simultaneously with an embroidery job to be executed on the embroidery apparatus side, from an embroidery image input by a single input, and creates dyeing data for each dyeing job.

The maintenance controller 720 includes a job-based required-embroidery-time estimation unit 501, a job-based estimated-embroidery-time storage unit 502, a post-maintenance embroidery time counting unit 503, a set-time storage unit 504, a first maintenance execution determination unit 505, a post-maintenance elapsed-time counting unit 506, a second maintenance execution determination unit 507, and a maintenance execution instruction unit 508.

The job-based required-embroidery-time estimation unit 501 is a required time calculation unit that calculates (predicts or estimates) the required time of the embroidery (post-processing) for each dyeing job. For example, the estimated required time of embroidery associated with the dyeing job for outputting the embroidery original is calculated based on the number of stitches and the thread linear-velocity information (thread consumption velocity) acquired from the embroidery apparatus.

The job-based estimated-embroidery-time storage unit 502 stores the estimated embroidery time for each job estimated by the job-based required-embroidery-time estimation unit 501.

The post-maintenance embroidery time counting unit 503 calls the estimated embroidery lime for each job starting from the execution of the maintenance, and calculates the total of the estimated embroidery times of the dyeing jobs executed after the execution of the maintenance. Thus, the total time of the estimated required time of embroidery associated with the dyeing job from the previous maintenance execution time point at the current time point to the end time point of the next dyeing job is calculated.

The set-time storage unit 504 stores a set time serving as a threshold value for determining execution of maintenance.

When the next dyeing job is present at the end of the current dyeing job, the first maintenance execution determination unit 505 determines whether the maintenance can be executed based on comparison between the set time and the total time of the estimated required times of the embroidery associated with the dyeing job from the previous maintenance execution time to the end of the next dyeing job.

For example, the first maintenance execution determination unit 505 determines to execute the maintenance when the total time of the estimated required times of the embroidery associated with the dyeing job from the previous maintenance execution time to the end time of the next dyeing job is equal to or longer than the set time at the end time of the current dyeing job. On the other hand, when the total time of the estimated required times of the embroidery associated with the dyeing job from the previous maintenance execution time to the end time of the next dyeing job is less than the set time at the end time of the current dyeing job, the first maintenance execution determination unit 505 determines not to execute the maintenance.

Further, when the total time of the estimated required times of embroidery associated with the first dyeing job is less than the set time at the start of the dyeing job group, the first maintenance execution determination unit 505 compares, with the set time, the total time of the estimated required times of embroidery and the conveyance time after the discharge of the discharge head. Then, based on a result of comparison between the set time and the total time of the estimated required times and the conveyance time after discharge, the first maintenance execution determination unit 505 determines whether to execute maintenance (start-up maintenance) of the discharge heads 30K, 30C, 30M, and 30Y.

The post-discharge conveyance time used in this determination is preferably calculated using the post-discharge conveyance distance of the most upstream discharge head (for example, the discharge head 30K in this embodiment) where the post-discharge conveyance time is longest. When the total time of estimated required times of embroidery associated with a first dyeing job and a conveyance time after discharge is equal to or longer than a set time at a start time of a dyeing job group, the first maintenance execution determination unit 505 determines to execute maintenance. On the other hand, when the total time of the estimated required times of the embroidery associated with the first dyeing job and the conveyance time after discharge is less than the set time, the first maintenance execution determination unit 505 determines not to execute maintenance.

The post-maintenance elapsed-time counting unit 506 counts the actual elapsed time from the execution of the maintenance to the current job end timing. That is, the total time is counted of one or more dyeing jobs of the time required for the dyeing operation in association with the actual embroidery operation from the previous maintenance execution time to the end time of the present dyeing job.

The second maintenance execution determination unit 507 determines whether the maintenance can be executed based on the comparison between the set time and the total time actually required from the previous maintenance execution time to the end time of the current dyeing job.

For example, the second maintenance execution determination unit 507 determines to execute the maintenance when the total time actually required from the previous maintenance execution time to the end time of the current dyeing job exceeds the set time.

On the other hand, when the total time actually required from the previous maintenance execution time point to the end time point of the current dyeing job is less than the set time, the second maintenance execution determination unit 507 notifies the first maintenance execution determination unit 505 of the fact, and proceeds to the determination of maintenance execution in the first maintenance execution determination unit 505.

The first maintenance execution determination unit 505 and the second maintenance execution determination unit 507 function as determination units that determine whether to execute maintenance on the discharge heads 30K, 30C, 30M, and 30Y.

The maintenance execution instruction unit 508 instructs the dummy-discharge-data insertion unit 712, the head controller 131K, and the head position controller 702 to execute maintenance when the first maintenance execution determination unit 505 or the second maintenance execution determination unit 507 determines that maintenance is to be executed.

In the discharge-data editor 710, upon receiving a maintenance instruction from the maintenance execution instruction unit 508, the dummy-discharge-data insertion unit 712 retrieves dummy discharge data for maintenance stored in the dummy-discharge-data storage unit 713 and outputs, to the head controller 131K, discharge data in which the dummy discharge data is inserted between the dyeing data for the current dyeing job and the dyeing data for the next dyeing job.

The functions of the head-based inter-device distance calculation unit 511, the head-based inter-device distance storage unit 512, and the head-based post-discharge required-conveyance-time calculation unit 513 in the maintenance controller 720 of the data processor 701 are described below with reference to FIGS. 14 and 15.

Example of Hardware Configuration

Figure 11:
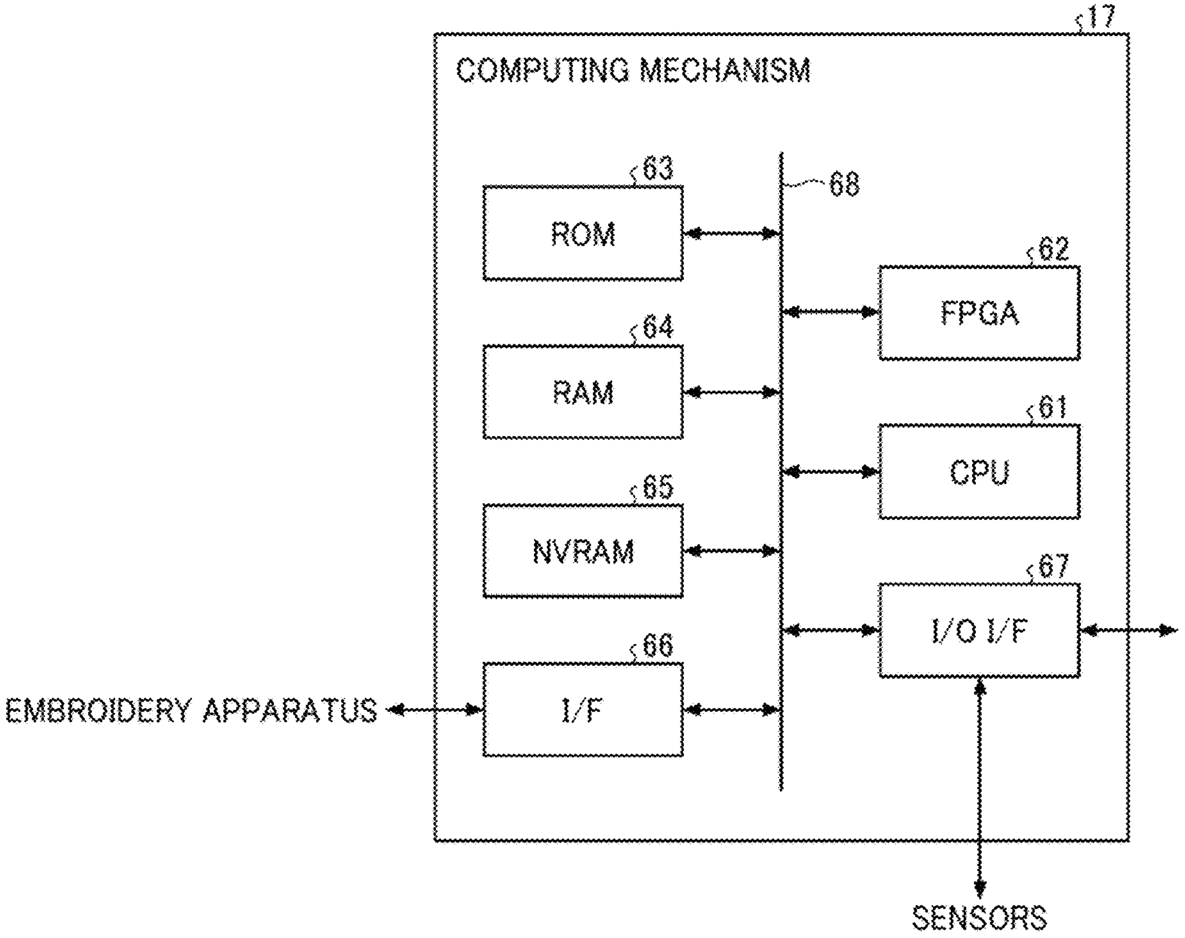
FIG. 11 is a block diagram illustrating an example of hardware configuration of a computing mechanism of a data processor.

Next, a hardware configuration of the computing mechanism 17 is described with reference to FIG. 11. FIG. 11 is a block diagram illustrating an example of hardware configuration of the computing mechanism 17.

As illustrated in FIG. 11, the data processor 701 includes a central processing unit (CPU) 61, a field-programmable gate array (FPGA) 62, a read only memory (ROM) 63, a random access memory (RAM) 64, and a non-volatile (NV) RAM 65, an interface (I/F) 66, and an input-output (IO)

interface 67 that are connected via a memory bus 68. The memory bus 68 may be divided into a plurality of buses.

In the computing mechanism 17, the CPU 61 controls the discharge of the dyeing apparatus 1. Various types of information, control programs, and the like are stored in the ROM 63. The RAM 64 is used as a working area when various processes are executed.

For example, the CPU 61 uses the RAM 64 as a working area, executes various control programs stored in the ROM 63, and outputs control commands for controlling various operations in the dyeing apparatus 1. At this time, the CPU 61 performs various operation controls in the dyeing apparatus 1 in cooperation with the FPGA 62 while communicating with the FPGA 62.

In addition, the FPGA 62 has functions of the first maintenance execution determination unit 505 and the second maintenance execution determination unit 507 illustrated in FIG. 10 in an executable manner. Although FIG. 11 illustrates an example in which one FPGA 62 is provided, two FPGAs that respectively execute the first maintenance execution determination unit 505 and the second maintenance execution determination unit 507 may be separately provided.

The NVRAM 65 stores information inherent to the apparatus, updatable information, and the like. For example, the time required for the retraction and return movement of the discharge heads is stored in advance in the NVRAM 65. Note that the NVRAM 65 may be configured to be insertable and removable.

The interface 66 mediates exchange of information with an external device (see FIG. 22) such as the embroidery apparatus 2 or a host computer. The IO interface 67 mediates exchange of information with each unit in the apparatus. The drive waveform generator 133, an input-and-output device such as an operation panel, various sensors, and the like can be connected to the IO interface 67. The various sensors are, for example, the HP sensor 39 that detects the position of the carriage 331, sensors that detect the environment inside the apparatus such as temperature and humidity that affect the determination of the necessity of dummy discharge, and the like.

In the first embodiment of the present disclosure, counting of elapsed time after maintenance is performed in the FPGA 62. With this configuration, even when a client personal computer (PC) is connected to an information processing apparatus (see FIG. 22) that outputs dyeing data (original data), the client PC side (rendering side) does not need to have a counting function, and rendering software in the client PC can have versatility.

In FIGS. 7 and 10, the examples in which all the functions of the computing mechanism 17 and the head controllers 131K, 131C, 131M, and 131Y are provided in the dyeing apparatus 1 have been described. However, in some embodiments, some or all of the functions of the computing mechanism 17 and the head controllers 131K, 131C, 131M, and 131Y may be provided in a client PC (e.g., a host control device 4 in FIG. 22) connected to the embroidery system.

Control Process

Figure 12:
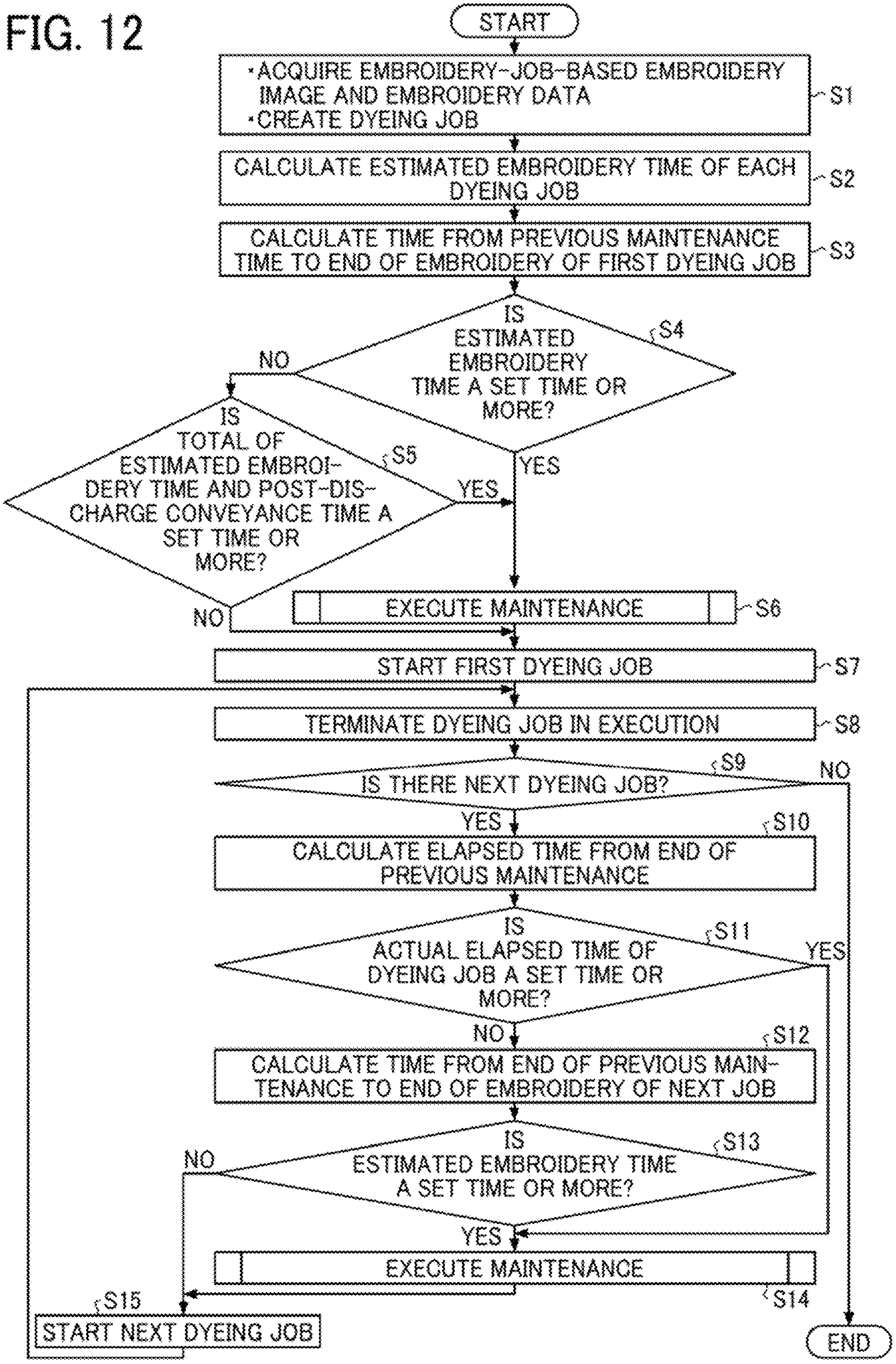
FIG. 12 is a flowchart of a dyeing operation including maintenance according to an embodiment of the present disclosure.

FIG. 12 is a flowchart of a dyeing operation including maintenance according to an embodiment of the present disclosure.

In step S1, an embroidery image and embroidery date are acquired for each embroidery job, and a dyeing job is created.

In step S2, the estimated embroidery time of each dyeing job is calculated.

In step S3, the time required from the previous maintenance to the end of the embroidery of the first dyeing job is calculated.

In step S4, when the estimated embroidery time is equal to or longer than the set time (Yes in step S4), maintenance of a discharge head (start-up maintenance) is performed in step S6. Details of the maintenance are described below with reference to FIG. 13 or 18.

On the other hand, if the estimated embroidery time is less than the embroidery time (No in step S4), the process proceeds to step S5, and it is determined whether the total time of the estimated embroidery time and the post-discharge conveyance time is equal to or greater than a set time.

If the total time of the estimated embroidery time and the post-discharge conveyance time is equal to or longer than the set time in step S5 (Yes in step S5), maintenance of the discharge head (start-up maintenance) is executed in step S6.

For example, at the start of dyeing for a first embroidery job group among a plurality of embroidery job groups including one or a plurality of embroidery jobs to be performed on one cloth or one cloth product, the start-up maintenance of step S6 is usually performed.

On the other hand, in the case where a plurality of embroidery job groups to be executed on the same cloth are included and the second and subsequent embroidery job groups are executed, the start-up maintenance is often unnecessary.

Further, when the previous embroidery job group and the current embroidery job group are executed on different cloths (for example, different parts such as a front body, a back body, sleeves, and a collar of clothes) in one cloth product and the change of cloths is necessary on the embroidery apparatus side, the start-up maintenance is necessary or unnecessary according to the time required for the change of cloths.

On the other hand, if the estimated embroidery time is less than the embroidery time (No in step S4) and the total time of the estimated embroidery time and the post-discharge conveyance time is less than the set time (No in step S5), the first dyeing job is started in step S7 without performing maintenance. The start of the dyeing job means that the dyeing job is executed, the thread N is conveyed in the dyeing apparatus 1 in conjunction with the consumption of the thread by the embroidery operation in the embroidery apparatus 2, and liquid droplets are discharged onto the thread N being conveyed, to execute the dyeing.

Then, in step S8, the dyeing job being executed is ended.

If there is a next dyeing job in step S9, the process proceeds to step S10. Alternatively, if there is no next dyeing job in step S9, the process ends.

In step S10, an estimated embroidery time, which is the time required from the end of the previous maintenance time to the end of the embroidery of the next dyeing job, is calculated.

In step S11, it is determined whether the actual elapsed time from the previous maintenance end time at the end of the current job is equal to or longer than the set time. If the actual elapsed time is equal to or longer than the set time in step S11 (Yes in step S11), the process proceeds to step S14 and maintenance is performed. Alternatively, if the actual elapsed time is less than the set time, the process proceeds to step S12.

In step S12, an estimated embroidery time, which is the time required from the end of the previous maintenance to the end of the embroidery of the next dyeing job, is calculated.

In step S13, it is determined whether the estimated embroidery time is equal to or longer than the set time. If the estimated embroidery time is equal to or longer than the set time (Yes in step S13), the process proceeds to step S14, and maintenance is performed. Alternatively, when the estimated embroidery time is less than the set time, the process proceeds to step S15.

If No in step S11 and No in step S13, that is, if both the actual elapsed time and the estimated embroidery time are less than the set time, the process proceeds to step S15 without performing maintenance, and the next dyeing job is started.

After completion of the dyeing job (step S8), it is determined whether there is a further next dyeing job in step S9. If there is a next dyeing job (Yes in step S9), the steps S10 to S15 and S8 are repeated.

When there is no next dyeing job after the end of the dyeing job being executed (No in step S9), the process ends.

In this process, it is determined whether to execute maintenance, with reference to the time taken to complete the next dyeing job, in steps S3 and S4 before the start of staining in step S7 and steps S12 to S13 before the start of each dyeing job in step S15. As a result, as illustrated in FIG. 9C described above, the interval of maintenance is set to an appropriate timing without a large deviation from the set time, and maintenance can be performed as appropriate before an adverse effect due to drying occurs.

In addition, when the accuracy of estimation of the time required for the embroidery is low or some trouble occurs during the dyeing job, a large deviation may occur between the estimated time until the end of the dyeing job and the time until the actual end of the dyeing job. For this reason, in steps S10 and S11 immediately after the end of the dyeing job in step S8, it is determined whether to execute maintenance based on the time actually taken.

The actual elapsed time is compared with the set time in this manner, and the estimated embroidery time is further compared with the set time. Thus, the actual maintenance interval is set to an appropriate timing without a large deviation from the set time. Accordingly, maintenance can be appropriately performed before an adverse effect due to drying occurs.

Detailed Process of Maintenance of First Configuration Example

Figure 13:
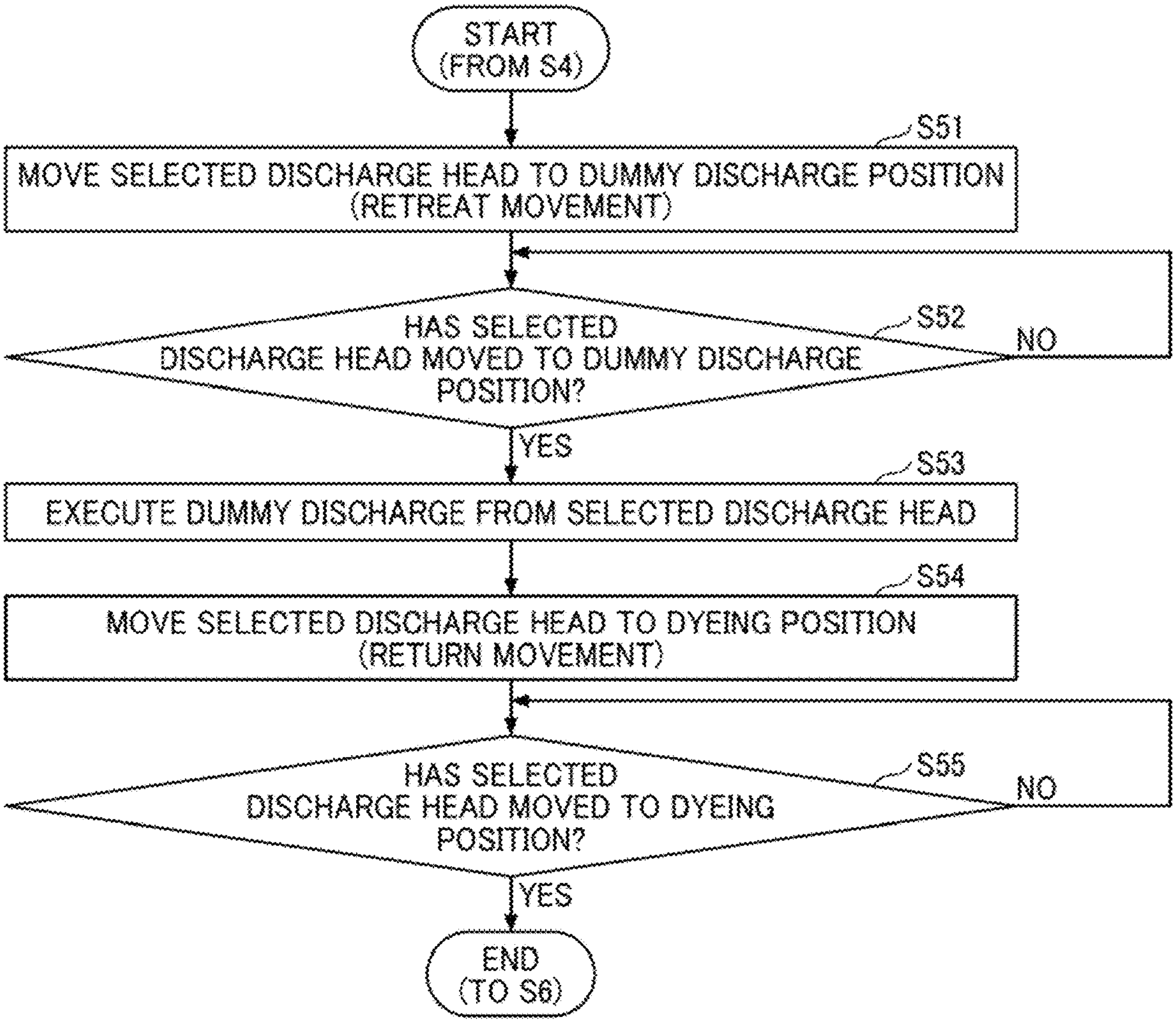
FIG. 13 is a detailed flowchart of a maintenance execution operation according to the first configuration example of the present disclosure.

FIG. 13 is a detailed flowchart of the maintenance execution operation according to the first configuration example of the present disclosure. In steps S5, S11, and S13 of FIG. 12, if it is determined that the set time is exceeded and maintenance is necessary (Yes), the process proceeds to step S6 (or step S14) and the process of FIG. 13 is started.

In step S51, the corresponding discharge head 30K, 30C, 30M, or 30Y (or the corresponding ones of the discharge heads 30K, 30C, 30M, and 30Y) is moved to a position where dummy discharge is possible, in other words, a dummy discharge position. The position where dummy discharge is possible is a position where the nozzle row during the dyeing operation is retracted from the position facing the thread N.

In step S52, it is determined whether the corresponding discharge head 30K, 30C, 30M, or 30Y that performs dummy discharge at that timing have moved to the position where dummy discharge is possible. If it is determined that the corresponding discharge head 30K, 30C, 30M, or 30Y has moved to the position where dummy discharge is possible (Yes in step S52), the process proceeds to S53. If it is determined that the corresponding discharge head 30K, 30C, 30M, or 30Y has not moved to the position where dummy discharge is possible (No in step S52), the head movement is continued until the corresponding discharge head 30K, 30C, 30M, or 30Y to perform dummy discharge reaches the predetermined dummy discharge position.

As a method of determining whether the corresponding discharge head 30K, 30C, 30M, or 30Y has moved to the dummy discharge position, for example, in the case of a stepper motor, determination is made based on whether counting of a predetermined number of pulses of a plurality of stepper motors necessary for the corresponding discharge head 30K, 30C, 30M, or 30Y to move to a dischargeable position is completed. Alternatively, the head moving motor 314 may be provided with an encoder sensor, and the determination is made from a moving distance calculated from the phase and the number of encoder pulses. Alternatively, a photosensor may be provided at the movement position, and a feeler attached to a discharge head moves to shield the photosensor from light, thus allowing determination.

When it is detected that the corresponding discharge head 30K, 30C, 30M, or 30Y to perform dummy discharge has reached the predetermined dummy discharge position (Yes in step S52), the corresponding discharge head 30K, 30C, 30M, or 30Y performs dummy discharge to the collection surface 38 serving as a dummy discharge receiver in step S53.

When the discharge is completed, the corresponding discharge head 30K, 30C, 30M, or 30Y that has performed the dummy discharge is moved to a dyeing position in step S54. The dyeing position is a position where the nozzle row 32*a* that performs the dyeing operation faces the thread N.

In step S55, it is determined whether the corresponding one(s) of the discharge heads 30K, 30C, 30M, and 30Y, which has performed dummy discharge, has moved to the dyeing position. In a case where it is determined that the corresponding discharge head(s) has not moved (No in step S55), the head movement is continued until the corresponding one(s) of the discharge heads 30K, 30C, 30M, and 30Y that has performed the dummy discharge reaches the predetermined dyeing position.

The determination can be made based on completion of counting of a predetermined number of pulses of the stepper motor, a movement amount calculated from an output result of the encoder sensor, light shielding of the photosensor, and the like, as in the case of step S52.

When it is determined that the nozzle array has returned to the dyeing position (Yes in step S55), the dummy discharge operation is ended. The process proceeds to step S7 of FIG. 12, and the dyeing operation of the dyeing job is started using the nozzle array that has completed the dummy discharge.

Although the maintenance operation in step S6 of FIG. 12 has been described with reference to FIG. 13, the maintenance operation in step S14 is performed in the same manner.

Head-Based Control

In FIG. 9C, as the control according to an embodiment of the present disclosure, in order to describe the difference in timing from the comparative examples, the dyeing time has been described with a timing matched with the calculated embroidery time and the maintenance execution period in a diagram without a time shift. However, in practice, as illustrated in FIG. 1, the dyeing device 103 and the embroidery head 20 are separated from each other. For this reason, when dyeing and embroidering a common embroidery image in the same job, the dyeing job is performed at an earlier timing than the embroidery job in consideration of conveyance.

Figure 14:
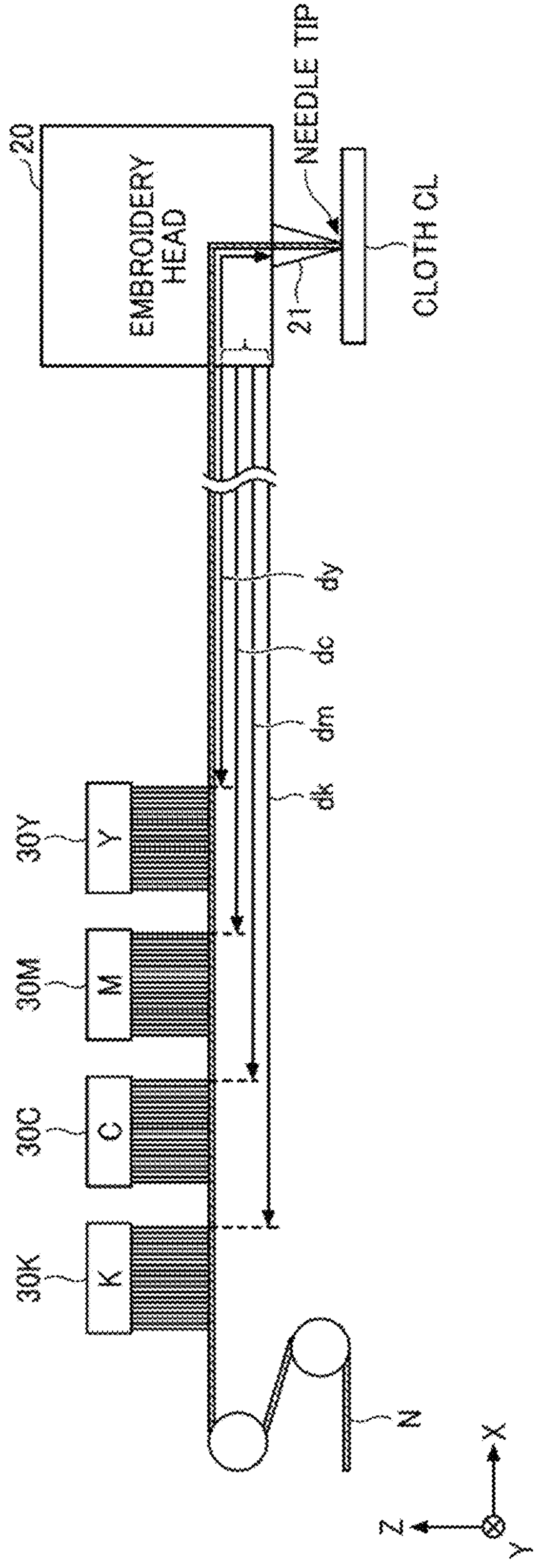
FIG. 14 is a side view illustrating a state in which droplets are simultaneously discharged from a plurality of nozzles in a plurality of discharge heads of a dyeing device, according to an embodiment of the present disclosure.

FIG. 14 illustrates a state in which all the nozzles simultaneously discharge droplets onto the thread N in the plurality of discharge heads 30K, 30C, 30M, and 30Y of the dyeing device 103 illustrated in FIGS. 2 and 3.

As illustrated in FIG. 3, in the discharge heads 30K, 30C, 30M, and 30Y, the nozzle rows 32*a* are aligned in the same direction as the conveyance direction of the thread N immediately above the thread N along the conveyance direction of the thread N. Therefore, when droplets are simultaneously discharged from the plurality of nozzles 31 in one nozzle row 32*a* (32*a*K, 32*a*C, 32*a*M, or 32*a*Y (see FIG. 3)) of each of the discharge heads 30K, 30C, 30M, and 30Y to the thread N, the droplets can be simultaneously applied to different positions on the thread N in the conveyance direction as illustrated in FIG. 14.

Therefore, it is desirable that dyeing and maintenance can be performed at timings suitable for each of the discharge heads 30K, 30C, 30M, and 30Y in consideration of the dyeing position on the thread N due to conveyance.

Based on the inter-device distance D (see FIG. 1) between the dyeing apparatus 1 and the embroidery apparatus 2 acquired by the embroidery information acquiring unit 16, the head-based inter-device distance calculation unit 511 (see FIG. 10) of the data processor 701 calculates inter-device distances dk, dc, dm, dy (see FIG. 14) between each of the discharge heads 30K, 30C, 30M, and 30Y and the tip of the needle 21 of the embroidery apparatus 2. The head-based inter-device distance storage unit 512 stores the calculated inter-device distances dk, dc, dm, and dy.

The calculation of the inter-device distances is performed, for example, when the installation layout of the dyeing apparatus 1 and the embroidery apparatus 2 is changed. Thereafter, when the positions of the dyeing apparatus 1 and the embroidery apparatus 2 do not change, the stored inter-device distances dk, dc, dm, dy are called and used.

The head-based post-discharge required-conveyance-time calculation unit 513 calculates post-discharge required conveyance times Tk, Tc, Tm, and Ty (see FIG. 15) after droplets from the discharge heads 30K, 30C, 30M, and 30Y adhere to the thread, based on the inter-device distances dk, dc, dm, and dy and the thread conveyance speed acquired from the conveyance controller 703. The post-discharge required conveyance time is the time required for the droplets discharged from the nozzles of the discharge heads 30K, 30C, 30M, and 30Y to reach the needle 21 of the embroidery head 20 after the droplets adhere to the thread N.

Then, the head-based discharge-data output unit 714 of the discharge-data editor 710 outputs the dyeing data and the dummy discharge data for the respective colors to the head controllers 131K, 131C, 131M, and 131Y at timings advanced by the post-discharge required conveyance times Tk, Tc, Tm, and Ty with respect to the corresponding embroidery job.

Figure 15:
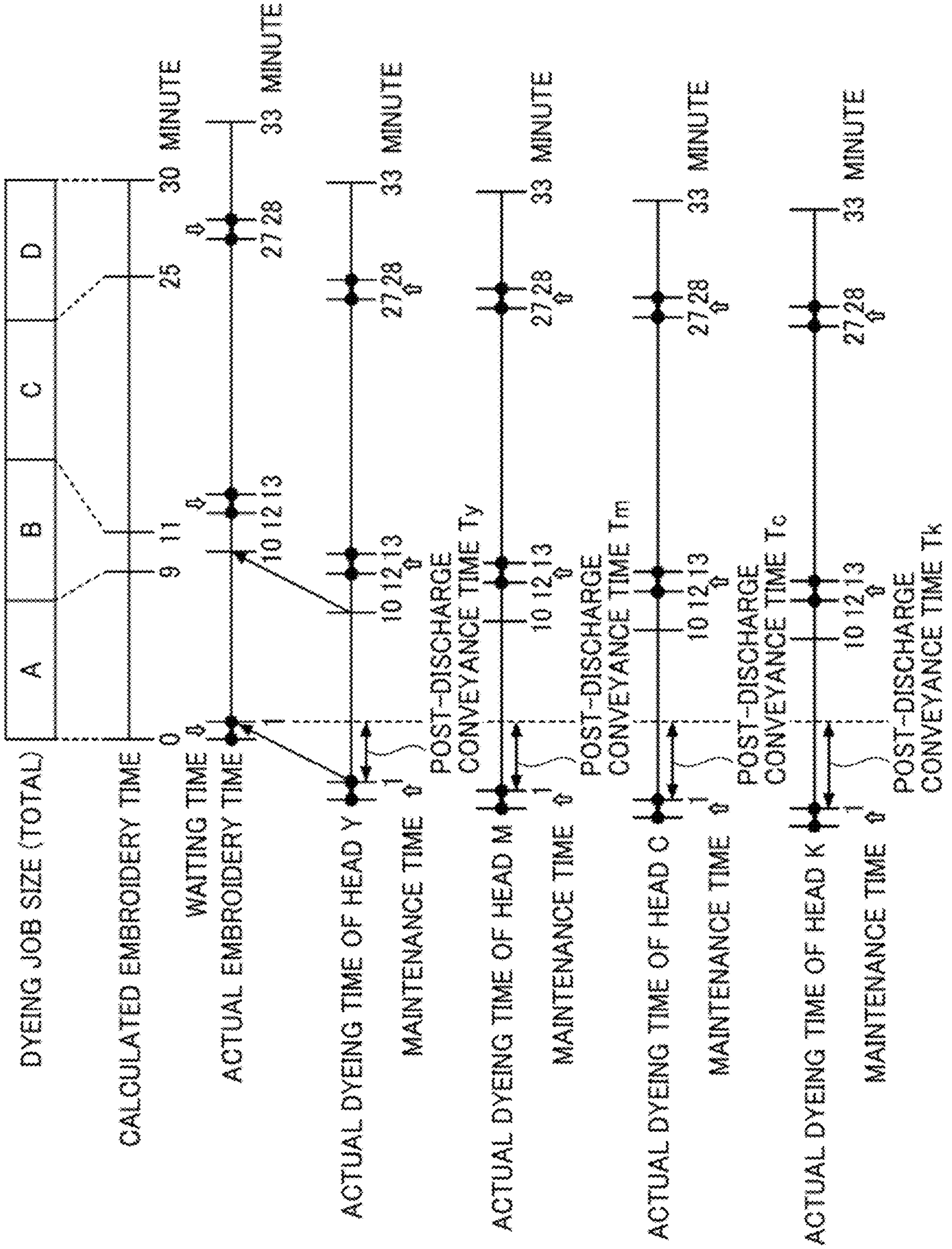
FIG. 15 is a diagram illustrating embroidery times and dyeing times corresponding to a dyeing job in a case where a plurality of discharge heads are separated from each other, and execution timings of maintenance.

FIG. 15 is a diagram illustrating the calculated embroidery time corresponding to the dyeing job, the actual embroidery time, and the dyeing time of the discharge head.

As described above, for the dyeing data and the dummy discharge data for the respective colors, the dyeing operation and the maintenance operation are performed at timings advanced by the post-discharge required conveyance times Tk, Tc, Tm, and Ty with respect to the corresponding embroidery job.

In this manner, the post-discharge required conveyance time is calculated, and the dyeing execution time and the maintenance execution time are set to the timings advanced with respect to the embroidery job in consideration of the calculated time. Thus, maintenance can be performed at appropriate timing even when the embroidery start position (post-processing start position) is separated from the head positions of the discharge heads 30K, 30C, 30M, and 30Y.

Here, in the discharge heads 30K, 30C, 30M, and 30Y, an example is illustrated in which the nozzle rows that discharge the respective colors are provided at different conveyance positions for each discharge head in the conveyance direction as illustrated in FIG. 14. However, for example, in the case of a configuration in which ink droplets of different colors are discharged at the same position in the conveyance direction, the time difference does not have to be provided for each head.

Further, as in step S5 of the process illustrated in FIG. 12 described above, at the start of a dyeing job group including one or more dyeing jobs, the first maintenance execution determination unit 505 determines whether to execute the maintenance (start-up maintenance) of the discharge head based on the result of comparison between the set time and the total time of the required times for embroidery and the conveyance time after discharge. When the total time of estimated required times of embroidery corresponding to a first dyeing job and a conveyance time after discharge is equal to or longer than the set time at the start of the dyeing job group, it is determined to execute maintenance. On the other hand, when the total time of the estimated required times of the embroidery and the conveyance time after discharge is less than the set time, the first maintenance execution determination unit 505 determines not to execute maintenance.

Second Configuration Example of Maintenance Mechanism

In the above-described configuration example, when the dummy discharge operation is performed, the discharge head is moved and retracted from the position facing the thread to discharge dummy discharge droplets. However, for example, discharge droplets may be bent during flight to land on the dummy discharge receiver without landing on the thread. The configuration is described below with reference to FIGS. 16 to 18 as a second configuration example of the mechanism related to maintenance.

Figure 16:
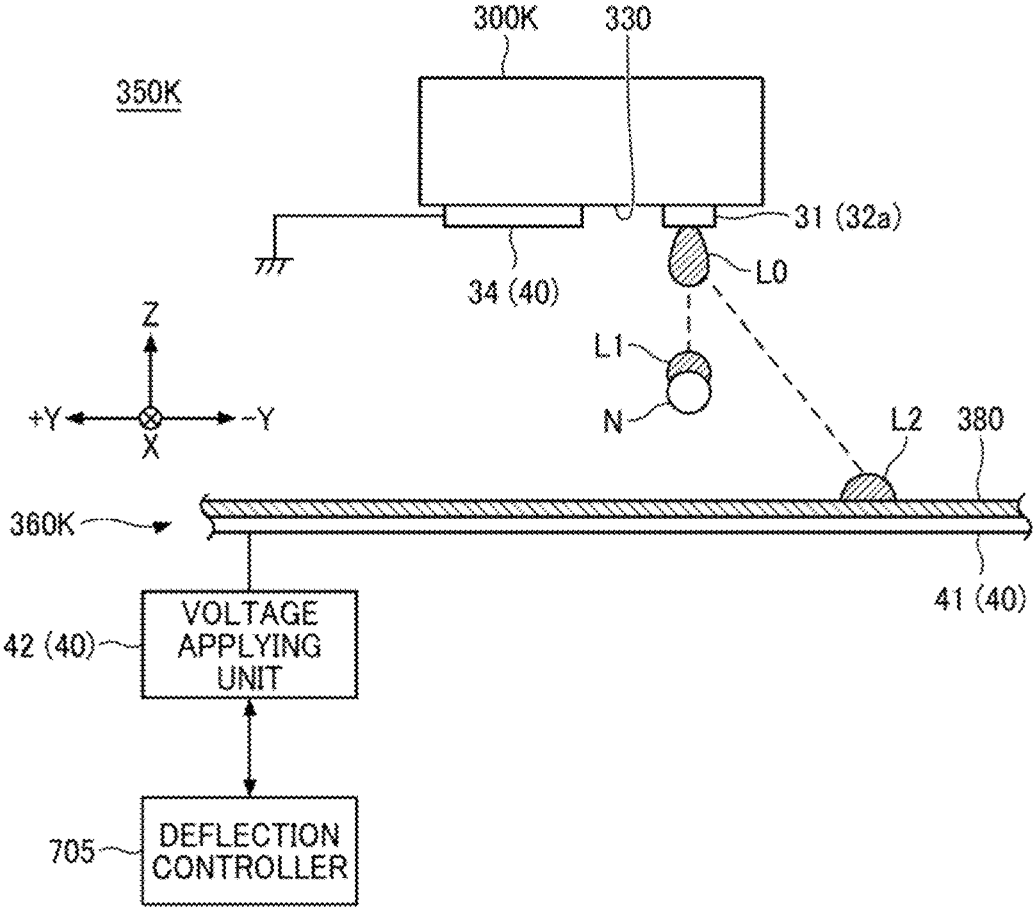
FIG. 16 is a diagram illustrating a schematic configuration of a dummy discharge receiver and a deflector according to a second configuration example of the present disclosure.

FIG. 16 is a diagram illustrating a schematic configuration of a discharge head, a dummy discharge receiver, and a deflector related to a maintenance mechanism according to the second configuration example of the present disclosure. In this configuration example, the maintenance mechanism includes a maintenance unit 360 and a first electrode 34 in a discharge head 300K.

In this configuration example, the maintenance mechanism also includes a deflector 40 that bends (deflects) droplets discharged from nozzles while flying of the droplets. The deflector 40 deflects the flying direction of droplets discharged from nozzles 31 in directions (±Y directions) orthogonal to a conveyance direction of a thread N.

The deflector 40 includes, for example, the first electrode 34, a second electrode 41, and a voltage applying unit 42. The first electrode 34 is grounded, and voltage is applied to the second electrode 41 from the voltage applying unit 42.

For example, the first electrode 34 is disposed on a nozzle surface 330 adjacent to a nozzle row 32*a* having nozzles 31 in the discharge head 300K of the present configuration example. The first electrode 34 is disposed on the front side or the back side in the depth direction to be adjacent to the nozzle row 32*a* at a predetermined interval.

The first electrode 34 is an elongated plate-shaped member that is long along the alignment directions (±X directions in FIG. 16) of the nozzle row 32*a*. For this reason, the first electrode 34 is disposed adjacent to all of the plurality of nozzles 31 of the nozzle row 32*a* provided in the discharge head 300K in a direction orthogonal to the alignment direction of the nozzle row 32*a* on the lower nozzle surface 330 of the discharge head 300K.

In the example illustrated in FIG. 16, the first electrode 34 is disposed on the rear side (+Y side) of the discharge head 300K with respect to the nozzle row 32*a*. In some embodiments, the first electrode 34 may be disposed on the front side (−Y side) of the discharge head 300K with respect to the nozzle row 32*a* or may be disposed on both sides (±Y sides) in a direction orthogonal to a thread conveyance direction (+X side) that is the alignment direction of the nozzle row 32*a*.

The second electrode 41 is disposed facing the nozzle surface 330 of the discharge head 300K across the thread N. In addition, in this configuration example, an upper surface plate 380 is disposed on the second electrode 41, and a part of the upper surface plate 380 functions as a dummy discharge receiver.

The voltage applying unit 42 is electrically connected to a deflection controller 705, and applies voltage to the second electrode 41 under the control of the deflection controller 705.

When the voltage is applied to the second electrode 41, an electric field having an intensity corresponding to the voltage value of the voltage applied to the second electrode 41 is formed between the second electrode 41 and the first electrode 34. On the other hand, a droplet L0 discharged from a nozzle 31 is charged to a predetermined polarity and a predetermined charge amount before flying from the nozzle 31. Accordingly, the flying direction of the charged droplet L0 discharged from the nozzle 31 is deflected by the influence of the electric field.

In the configuration example illustrated in FIG. 16, the first electrode 34 is disposed on the rear side of the discharge head 300K with respect to the nozzle 31. Thus, when an electric field is formed between the first electrode 34 and the second electrode 41, the flying direction of the droplet L0 discharged from the nozzle 31 is deflected toward the rear side or the front side in ±Y directions that are directions orthogonal to the conveyance direction of the thread N. Whether the flying direction of the droplet L, is deflected in the +Y direction or the −Y direction is determined by the charge applied before flying and the positive or negative of the voltage applied.

Here, in a case where the droplet L0 is discharged from the nozzle 31 when an electric field is not formed between the first electrode 34 and the second electrode 41, the discharged droplet L0 falls directly downward by gravity. The droplets falling directly downward adhere to the thread N extending so as to face the nozzle row 32*a*. Accordingly, a dot L1 adheres onto the thread N, and the components of the dot L1 permeate into the thread N. Thus, the thread N is colored (dyed).

On the other hand, in a case where a droplet L0 is discharged from the nozzle 31 when an electric field is formed between the first electrode 34 and the second electrode 41, the falling direction (flying direction) of the discharged droplet L0 is deflected from directly below to the −Y direction, and a dot L2 lands on the upper surface plate 380. In the dummy discharge operation according to the present configuration example, a droplet L0 is discharged, an electric field is generated to deflect the flying direction of the droplet L0 in a direction orthogonal to the thread conveyance direction by action of the electric field, the landing position of the droplet L0 is shifted from the thread N. and the droplet lands on the upper surface plate 380 serving as the dummy discharge receiver.

Although the deflector 40 illustrated in FIG. 16 has been described as having a configuration in which the flying direction of the droplet L0 is deflected by generating an electric field and the landing position of the droplet L0 is shifted from the thread N to land on the upper surface plate 380 serving as the dummy discharge receiver, the method of deflecting the droplet is not limited to the above-described method but may be any suitable method as long as the flying of the droplet can be deflected.

For example, the deflector 40 may be configured to deflect the droplet L0 using a magnetic field, wind power, sound waves, or the like. In addition, for example, a plurality of heating members such as heaters may be disposed immediately below the nozzle 31, and the heater to be energized may be adjusted to adjust the deflection direction or the deflection amount.

In the second configuration example, the maintenance unit 360 including the upper surface plate 380 serving as the dummy discharge receiver, the second electrode 41, and the voltage applying unit 42, and the first electrode 34 in the discharge head 300K function as the maintenance mechanism 350K for the discharge head 300K.

Figure 17:
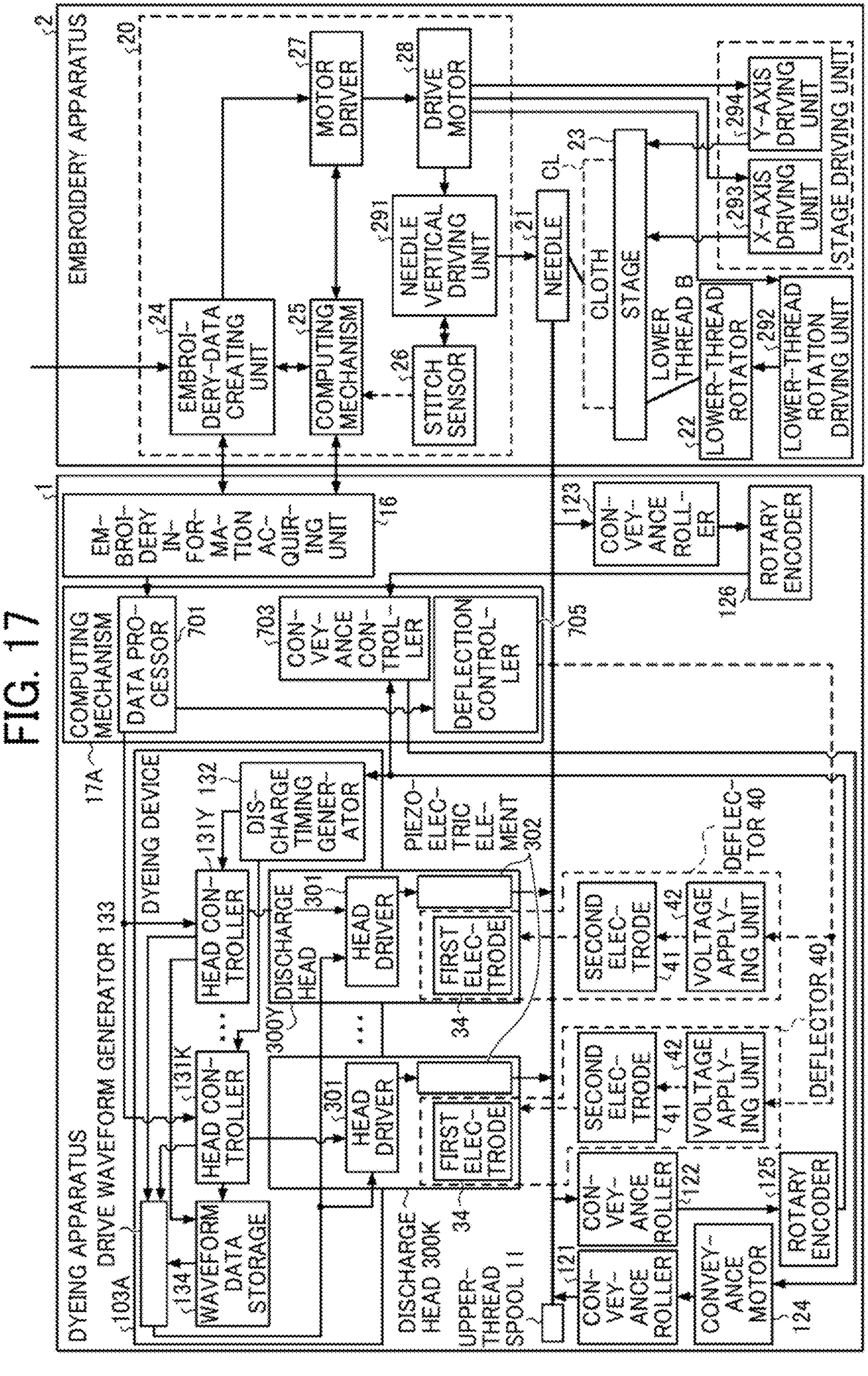
FIG. 17 is a schematic block diagram of a section related to drive control of an embroidery system according to the second configuration example of the present disclosure.

FIG. 17 is a block diagram related to drive control of the dyeing apparatus and the embroidery apparatus in the second configuration example of the present disclosure. Differences from the first configuration example are described below.

In the control configuration of the present configuration example, a computing mechanism 17A includes a deflection controller 705 instead of the head position controller 702 and the cap lifting controller 704.

When the maintenance execution timing for each head set by a data processor 701 is reached, the deflection controller 705 applies voltage to the second electrode 41 of the deflector 40. Then, in a state where an electric field is formed between the first electrode 34 and the second electrode 41, droplets are discharged by a predetermined number of droplets or for a predetermined time set in advance under the control of the head controller 131K. Thus, the droplets of the dummy discharge whose flying course has changed land on the upper surface plate 380 that is the dummy discharge receiver. When the dummy discharge is completed, the deflection controller 705 stops the application of the voltage to the second electrode 41.

The deflection controller 705 feeds back to the head controller 131K that the application of the electric field to the second electrode 41 is stopped, and the head controller 131K resumes the discharge operation for dyeing the thread N.

Detailed Process of Maintenance of Second Configuration Example

Figure 18:
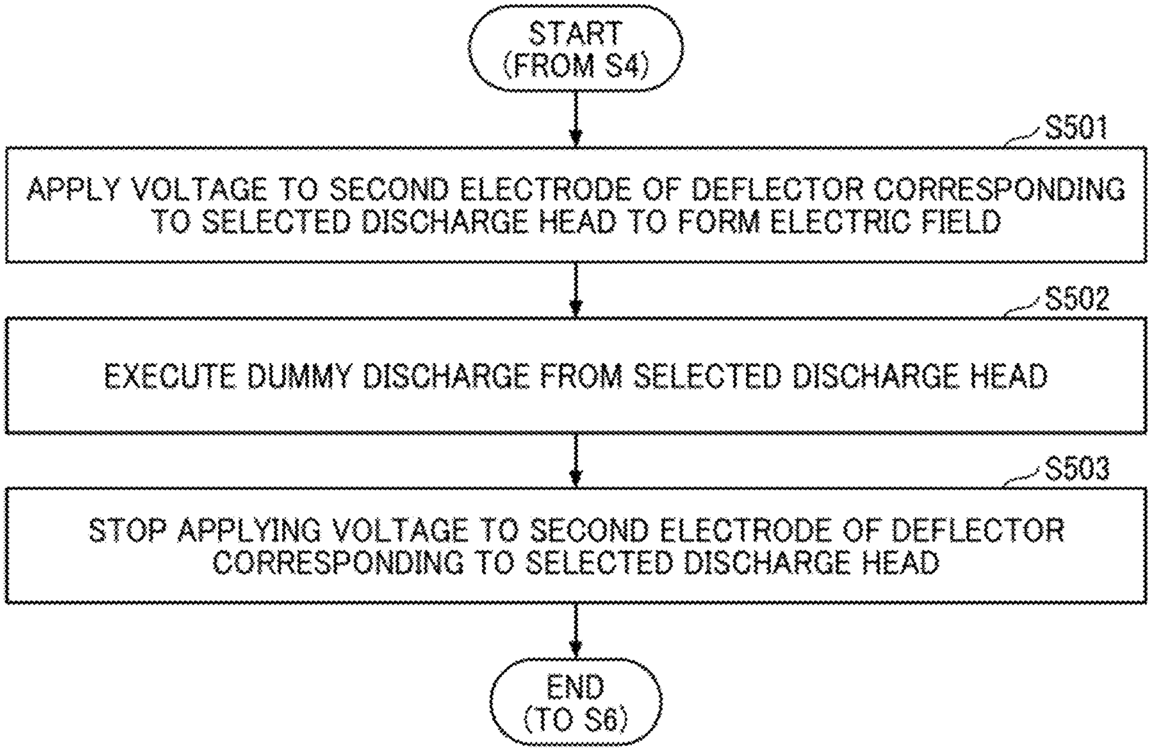
FIG. 18 is a detailed flowchart of a maintenance execution operation according to the second configuration example of the present disclosure.

FIG. 18 is a detailed flowchart of the maintenance execution operation according to the second configuration example of the present disclosure. Differences from the first configuration example are described below. In steps S5, S11, and S13 of FIG. 12, if it is determined that the set time is exceeded and maintenance is necessary (Yes), the process proceeds to step S6 (or step S14) and the process of FIG. 18 is started.

In step S501, voltage is to the second electrode 41 of the deflector 40K, 40M, 40C, or 40Y of the corresponding discharge head 300K, 300M, 300C, or 300Y, thus forming an electric field between the first electrode 34 and the second electrode 41.

Here, as illustrated in FIG. 15, the corresponding discharge head refers to the discharge heads 300K, 300M, 300C, and 300Y that execute maintenance at respective timings advanced by the post-discharge required conveyance times Tk, Tc, Tm, and Ty from the embroidery start time in response to a maintenance execution instruction to be performed between corresponding embroidery jobs.

In this state, droplets are discharged from the corresponding discharge heads 300K, 300M, 300C, and 300Y in step S502. When droplets are discharged in a state in which the electric field is generated, the flying droplets are deflected and land on the dummy discharge receiver (e.g., the upper surface plate 380) other than the thread N, which is dummy discharge.

After the end of the predetermined dummy discharge, the application of the voltage electric field to the second electrode 41 of the deflector is ended in step S503.

In the configuration in which the discharge head is moved as in the first configuration example illustrated in FIG. 13 described above, position detection control for confirming the completion of the movement of the discharge head is necessary in order to improve the accuracy of the stop position of the discharge head. In this configuration example, since there is no head movement, only the application of the voltage in the deflector is sufficient as the adjustment of the landing position at the time of maintenance execution, which is advantageous in terms of positional accuracy. Further, the movement of the discharge head, which takes time, ca be obviated, thus shortening the execution time of maintenance. However, an additional mechanism for generating the electric field is needed in this configuration.

Therefore, as the configuration for performing the dummy discharge operation (maintenance) in an embodiment of the present disclosure, it is preferable to appropriately select the first configuration example or the second configuration example according to the application, the configuration, the apparatus size, and the like

Second Embodiment

Figure 19:
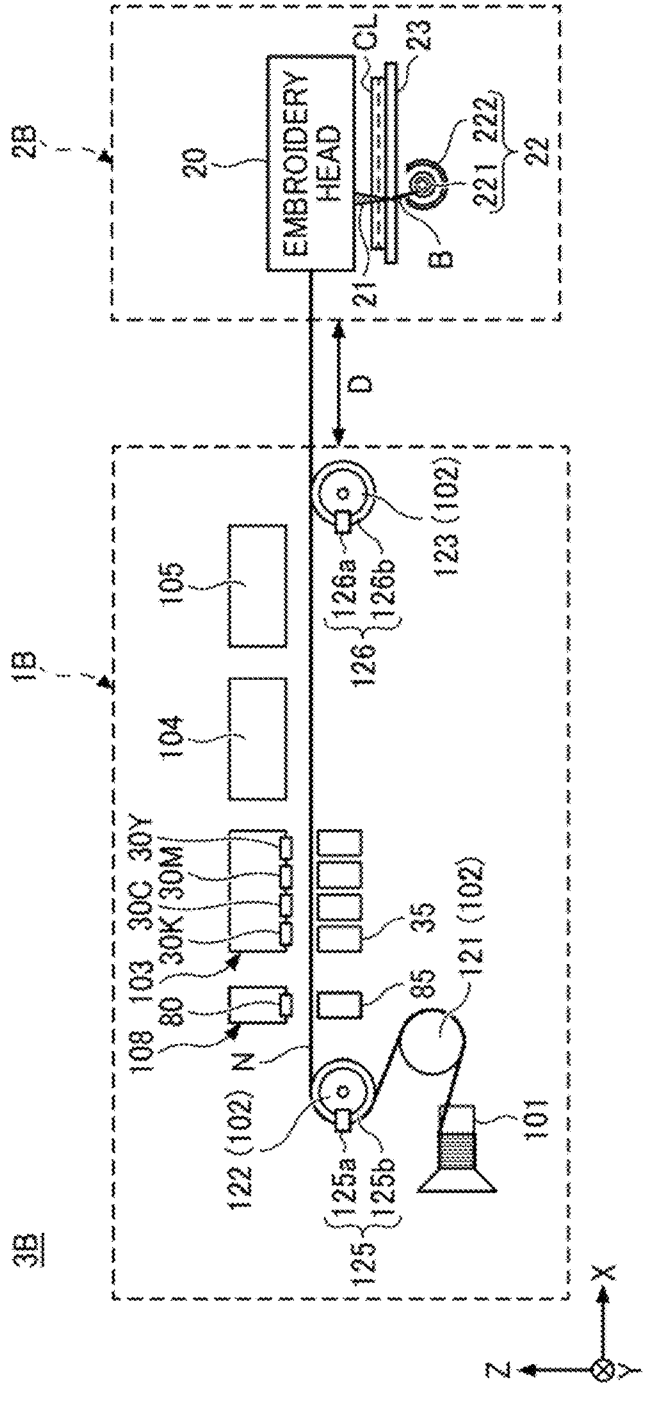
FIG. 19 is a schematic side view of an embroidery system on which a dyeing apparatus having a pretreatment liquid applying function is mounted, according to a second embodiment of the present disclosure.

FIG. 19 is a schematic view of an embroidery system 3B on which a dyeing apparatus having a pretreatment liquid applying function is mounted, according to a second embodiment of the present disclosure.

In the present embodiment, in a dyeing apparatus 1B, a pretreatment device 108 is disposed upstream from discharge heads 30K, 30C, 30M, and 30Y, which are dyeing heads of a dyeing device 103, in a conveyance direction of a thread N.

The pretreatment device 108 is provided with a pretreatment head 80. The pretreatment head 80 is a discharge head that discharges droplets of pretreatment liquid and applies the pretreatment liquid to the thread N. The pretreatment liquid is a transparent pre-coating liquid for aggregating ink droplets for dyeing on the thread and preventing bleeding.

As illustrated in FIGS. 2 and 3, the configuration of the pretreatment head 80 is similar to that of each of the discharge heads 30K, 30C, 30M, and 30Y of the dyeing device 103, in which nozzle rows in which nozzles that discharge droplets are aligned in rows are arranged, and the alignment direction of nozzles in each nozzle row is substantially the same as the conveyance direction of the thread.

Also in the pretreatment device 108, the head driving unit drives the pretreatment head 80 in conjunction with the conveyance of the thread N.

Figure 20:
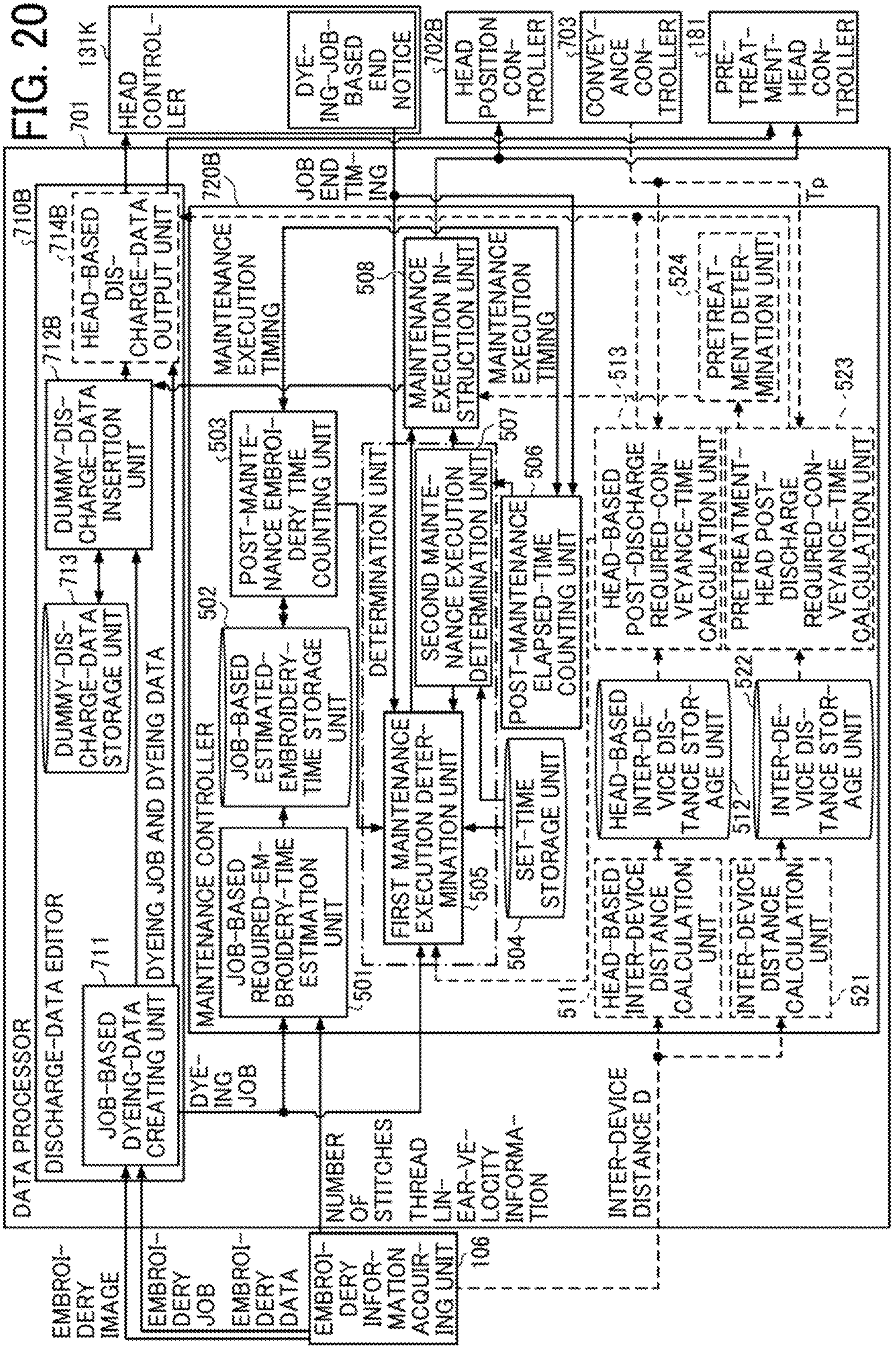
FIG. 20 is a functional block diagram of a section related to discharge and maintenance control according to the second embodiment.

FIG. 20 is a functional block diagram of a section related to discharge and maintenance control in the dyeing apparatus according to the second embodiment.

In the present embodiment, based on the inter-device distance D (see FIG. 19) between the dyeing apparatus 1B and an embroidery apparatus 2 acquired by an embroidery information acquiring unit 16, an inter-device distance calculation unit 521 of the data processor 701 calculates an inter-device distance dp between the pretreatment head 80 and the tip of a needle 21 of the embroidery apparatus 2. The inter-device distance storage unit 522 stores the calculated inter-device distance.

The pretreatment-head post-discharge required conveyance time calculation unit 523 serving as a post-pretreatment conveyance-time calculation unit calculates the time Tp required for the droplets discharged from the nozzles of the pretreatment head 80 to reach the needle 21 of the embroidery head 20 after adhesion to the thread.

A head-based discharge-data output unit 714B in a discharge-data editor 710B also outputs, to a pretreatment-head controller 181, pretreatment data and dummy discharge data for the pretreatment head at timings advanced by a post-discharge required conveyance time Tp with respect to the corresponding embroidery job.

A pretreatment determination unit 524 compares the total time of the required time for embroidery and the conveyance time after discharge of the pretreatment liquid with the set time, and determines whether to execute maintenance of the pretreatment head 80 based on the comparison result. When a total time of an estimated required time of embroidery corresponding to a first dyeing job and a conveyance time after discharge of a pretreatment head 80 is equal to or longer than a set time at the start of a dyeing job group, the pretreatment determination unit 524 determines to execute maintenance (start-up maintenance) of the pretreatment head 80. On the other hand, when the total time of the estimated required time of the embroidery and the conveyance time after discharge is less than the set time, the pretreatment determination unit 524 determines not to execute maintenance.

As a maintenance method of the pretreatment head 80, FIG. 20 illustrates a configuration in which dummy discharge is performed by moving the pretreatment head as in the first configuration example. However, dummy discharge may be performed by bending flying droplets by an electric field as in the second configuration example.

Figure 21:
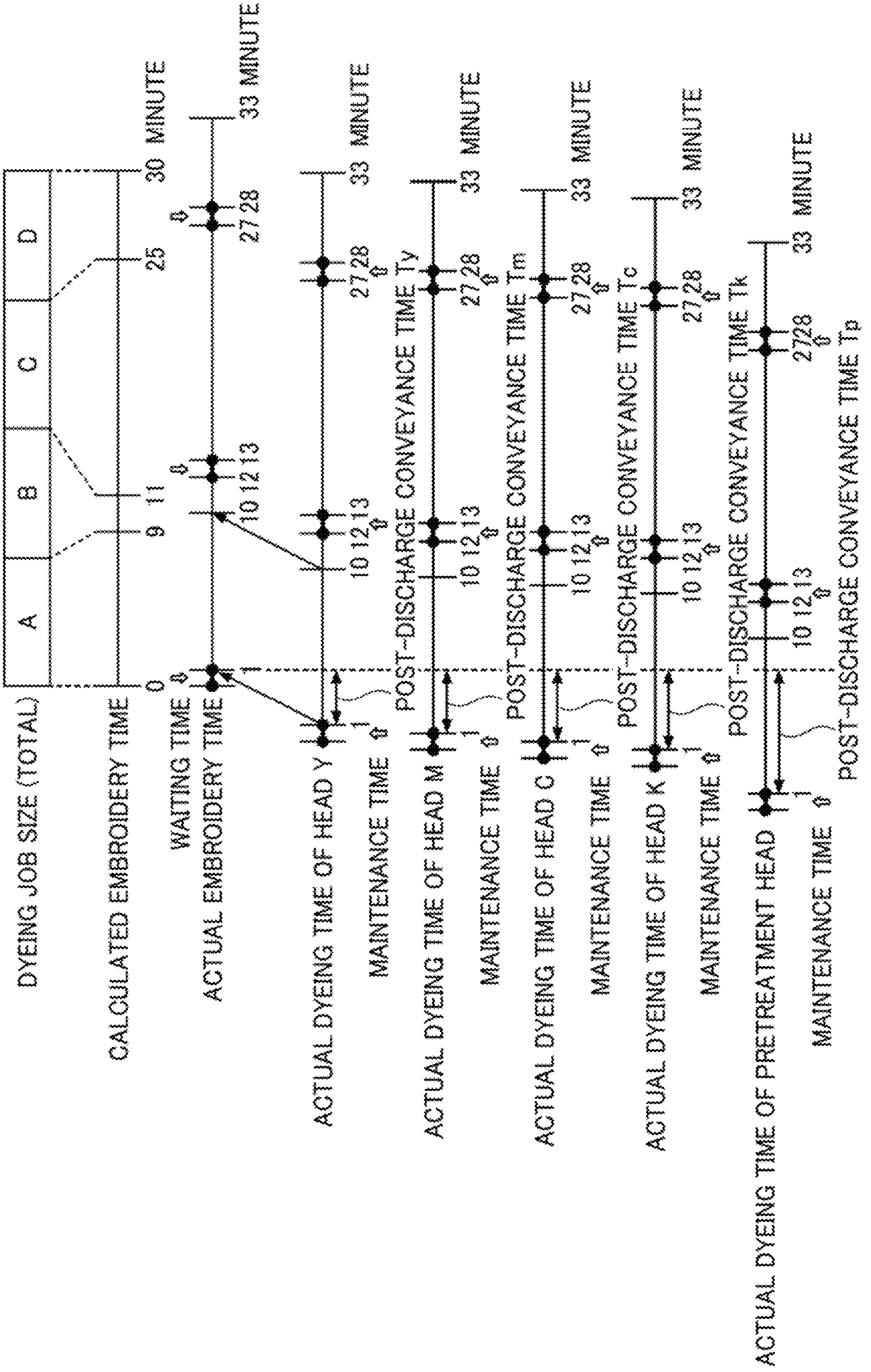
FIG. 21 is a diagram illustrating embroidery times and dyeing times corresponding to a dyeing job in a case where a pretreatment head is included, and execution timings of maintenance.

FIG. 21 is a diagram illustrating the calculated embroidery time corresponding to the dyeing job, the actual embroidery time, the dyeing time of the discharge head, and the pretreatment liquid application time.

The dyeing operation, the pretreatment liquid application operation, and the maintenance operation are performed at timings advanced by the post-discharge required conveyance times Tk, Tc, Tm, Ty, and Tp for the corresponding embroidery job with respect to the pretreatment data and the dummy discharge data of the pretreatment head, in addition to the dyeing data and the dummy discharge data for each color.

Since the pretreatment device 108 is disposed further upstream than the dyeing device 103 as illustrated in FIG.

19, the maintenance of the pretreatment head 80 is performed at a timing earlier than that of the discharge heads 30K, 30C, 30M, and 30Y as illustrated in FIG. 21.

As described above, the post-discharge required conveyance time is calculated, and the dyeing execution time, the pretreatment liquid application execution time, and the maintenance execution time are set to be earlier than those of the embroidery job in consideration of the calculated post-discharge required conveyance time. Thus, maintenance can be performed at appropriate timing even when the embroidery start position (post-processing start position) is away from the discharge heads 30K, 30C, 30M, and 30Y and the head position of the pretreatment head 80.

Such control allows maintenance to be performed at an appropriate timing even when the pretreatment liquid is necessary.

Further, in the present embodiment, at the timing of step S5 at the start of the dyeing job group of the process illustrated in FIG. 12 described above, it is possible to determine whether to execute maintenance of the pretreatment head 80 based on the comparison result between the set time and the total time of the required time for embroidery and the conveyance time after discharge of the pretreatment head 80.

Third Embodiment

Figure 22:
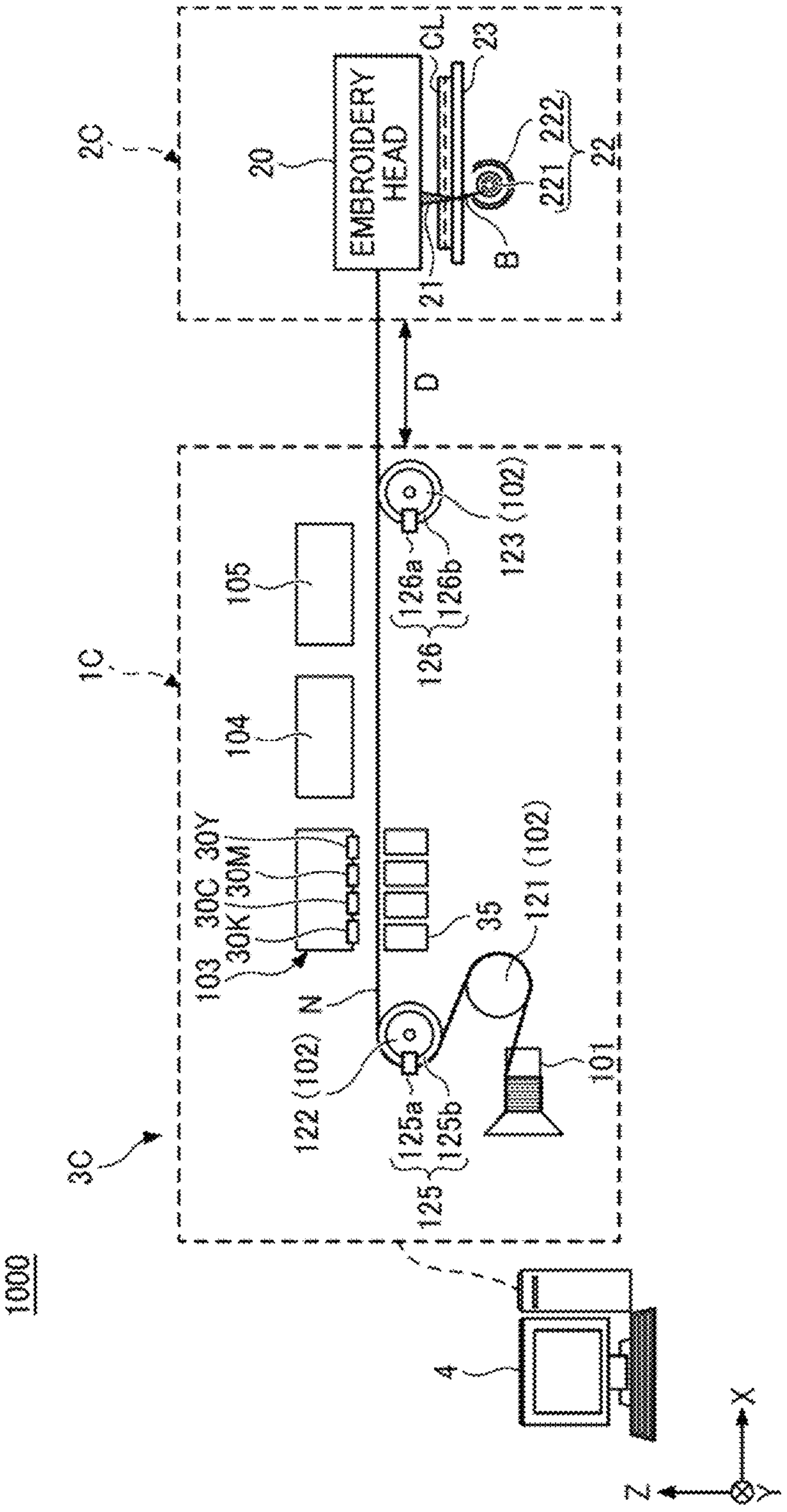
FIG. 22 is a schematic side view of an embroidery system including a host control device, according to a third embodiment of the present disclosure.

FIG. 22 is a schematic view of an embroidery system including a host control device, according to a third embodiment of the present disclosure. In the present embodiment, an embroidery system 1000 includes a host control device 4 in addition to the configuration of the embroidery system 3C.

Figure 23:
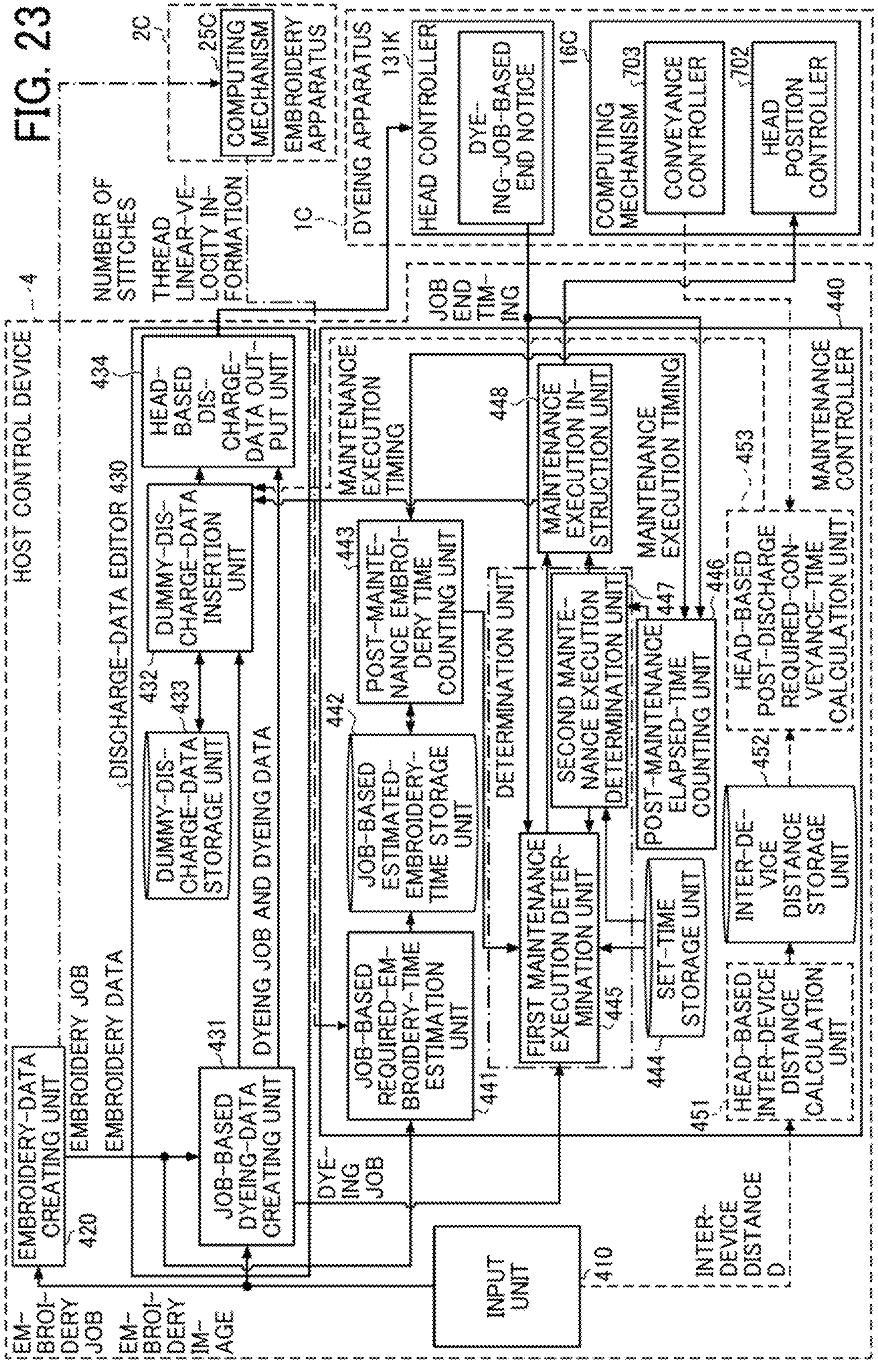
FIG. 23 is a functional block diagram of a section related to discharge and maintenance control according to the third embodiment.

FIG. 23 is a functional block diagram of a section related to discharge and maintenance control according to the third embodiment. In the control configuration of FIG. 23, as compared with the functional blocks illustrated in FIG. 10, the host control device 4 implements some functions of the discharge-data editor 710 and the maintenance controller 720 in the computing mechanism 17 of the dyeing apparatus 1 and some functions of the computing mechanism 25 of the embroidery apparatus 2. Note that members having the same names as those in FIG. 10 have the same functions, and description thereof are omitted as appropriate.

The host control device 4 includes an input unit 410, an embroidery-data creating unit 420, a discharge-data editor 430, and a maintenance controller 440.

The input unit 410, which is an embroidery image acquiring unit, is, for example, a communication unit with an external device or an operation panel, acquires an embroidery image (an embroidery file) from which embroidery data is generated, and outputs the acquired embroidery image to the embroidery-data creating unit 420 and the discharge-data editor 430.

The embroidery-data creating unit 420 creates embroidery data based on the embroidery image.

The discharge-data editor 430 includes a job-based dyeing-data creating unit 431, a dummy-discharge-data insertion unit 432, a dummy-discharge-data storage unit 433, and a head-based discharge-data output unit 434, and has the same function as the discharge-data editor 710 of the dyeing apparatus 1. The discharge-data editor 430 creates dyeing data based on an embroidery image, and outputs discharge data in which maintenance data is inserted between dyeing jobs, to the head controller 131K according to the case.

The maintenance controller 440 includes, in an executable manner, a job-based required-embroidery-time estimation unit 441, a job-based estimated-embroidery-time storage unit 442, a post-maintenance embroidery-time counting unit 443, a set-time storage unit 444, a first maintenance execution determination unit 445, a post-maintenance elapsed-time counting unit 446, a second maintenance execution determination unit 447, a maintenance execution instruction unit 448, a head-based inter-device distance calculation unit 451, an inter-device distance storage unit 452, and a head-based post-discharge required-conveyance-time calculation unit 453.

Since the host control device 4 includes the embroidery-data creating unit 420 related to embroidery, the discharge-data editor 430 related to dyeing, and the maintenance controller 440 in the same device, an acquisition unit and a communication unit for exchanging the number of stitches in embroidery and thread linear-velocity information are unnecessary.

In the embroidery system 3C configured as described above, the host control device 4 creates embroidery data and transmits the generated embroidery data to the embroidery apparatus 2C. The embroidery apparatus 2C transmits the number of stitches and the thread linear-velocity information (information on the current embroidery position of the embroidery) to the host control device 4. The dyeing apparatus 1C receives information on the dyeing data and the thread conveyance speed from the host control device 4, and transmits information on the end timing of the dyeing job for setting the maintenance execution timing to the host control device 4.

In the present system, the actual elapsed time is also compared with the set time as illustrated in FIG. 12, and the estimated embroidery time is further compared with the set time. Thus, the actual maintenance interval is set to an appropriate timing without a large deviation from the set time. Accordingly, maintenance can be appropriately performed on the discharge heads of the dyeing device before an adverse effect due to drying occurs.

Fourth Embodiment

Figure 24:
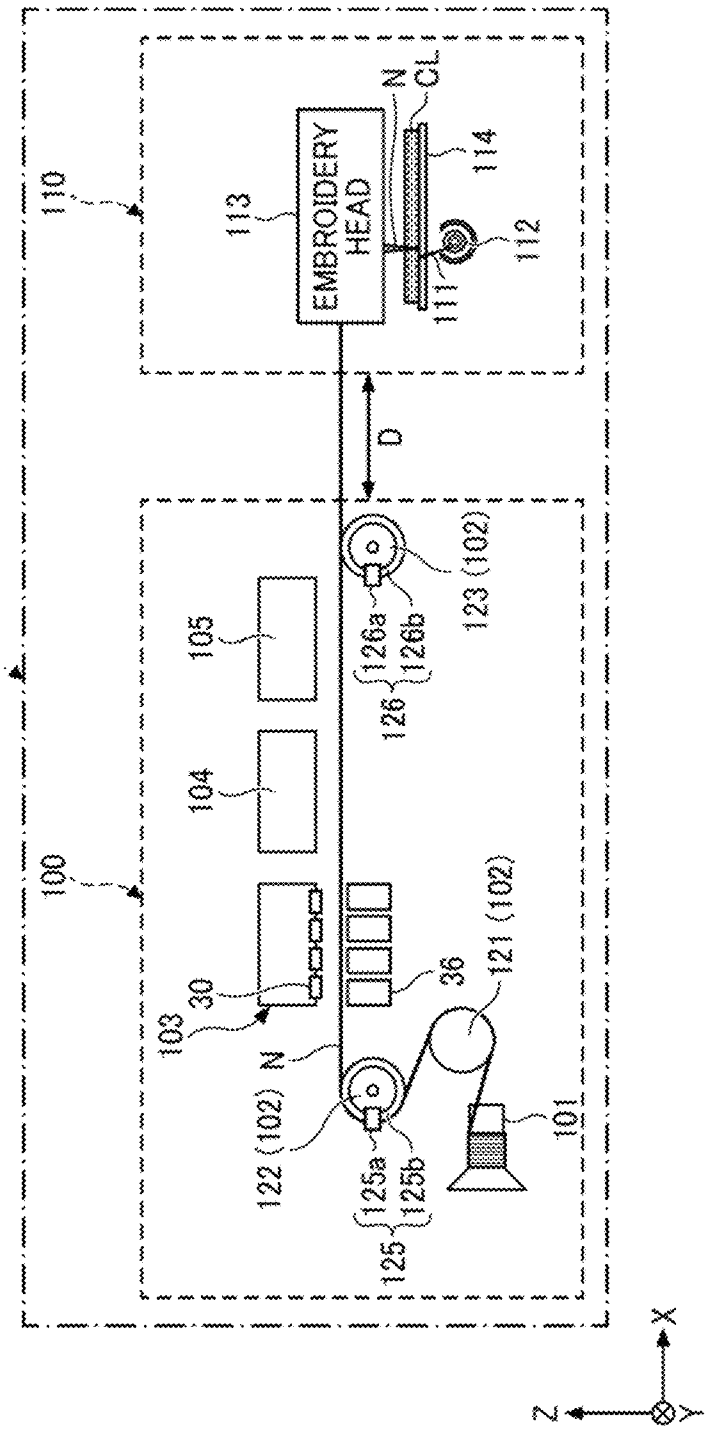
FIG. 24 is a schematic side view of an integrated dyeing embroidery apparatus according to a fourth embodiment of the present disclosure.

FIG. 24 is a schematic side view of an integrated dyeing embroidery apparatus according to a fourth embodiment of the present disclosure. A dyeing embroidery apparatus according to the present embodiment is an in-line type dyeing embroidery apparatus and includes a dyeing unit 100 and an embroidering unit 110.

In the present embodiment, since the dyeing unit 100 and the embroidering unit 110 are provided in the same device, the functions of the computing mechanisms 17 and 25 illustrated in FIG. 7 can be integrated into one computing device.

Although some embodiments and examples of the present disclosure have been described above, embodiments of the present disclosure are not limited to the above-described embodiments and examples. Embodiments of the present disclosure can be variously modified or changed in light of the appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus to be coupled to a post processor to perform post-processing using a linear medium such that the post processor is disposed downstream from the liquid discharge apparatus in a conveyance direction of the linear medium, the liquid discharge apparatus comprising:

a discharge head including a nozzle to discharge droplets onto the linear medium to dye the linear medium;

a conveyor to convey the linear medium in conjunction with the post processor;

a head driver to drive the discharge head in conjunction with conveyance of the linear medium;

control circuitry configured to control the head driver and determine whether to execute maintenance of the discharge head based on a time required for the post-processing for each dyeing job; and a memory to store a set time serving as a threshold value for determining whether to execute the maintenance, wherein the linear medium is a thread, wherein the post-processor is an embroidery apparatus including a needle and an embroiderer to create embroidery data based on an embroidery original and perform embroidery on a cloth using a thread passed through the needle in accordance with the embroidery data, wherein one dyeing job is an operation based on a thread dyeing instruction associated with one embroidery original, wherein the control circuitry is configured to acquire a number of stitches and thread linear-velocity information of the embroidery data created based on an embroidery image from the embroidery apparatus, wherein the control circuitry is configured to calculate an estimated required time of embroidery associated with a dyeing job for outputting the embroidery original, based on the number of stitches and the thread linear-velocity information, wherein the control circuitry is configured to determine whether to execute the maintenance of the discharge head based on the estimated required time of the embroidery, wherein a job to be executed includes a plurality of dyeing jobs, and wherein the control circuitry is configured to determine to execute the maintenance when a total time of the estimated required time of the embroidery associated with the dyeing job from a previous maintenance execution time to an end time of a next dyeing job is equal to or longer than the set time at an end time of a current dyeing job.

2. The liquid discharge apparatus according to claim 1, wherein the control circuitry is configured to determine to execute the maintenance when the total time of the estimated required time of the embroidery from the previous maintenance execution time to the end time of the next dyeing job is less than the set time at the end time of the current dyeing job and a total time actually required from the previous maintenance execution time to the end time of the current dyeing job is equal to or longer than the set time.

3. The liquid discharge apparatus according to claim 1, wherein the control circuitry is configured to calculate a time required for a droplet discharged from the nozzle of the discharge head to reach the needle of the embroiderer after the droplet adheres to the thread, and wherein the control circuitry is configured to determine whether to execute the maintenance of the discharge head based on a comparison result between a set time and a total time of a required time of the embroidery and a conveyance time after discharge.

4. The liquid discharge apparatus according to claim 1, further comprising:

a pretreatment head disposed upstream from the discharge head in a conveyance direction of the thread and discharge droplets of pretreatment liquid onto the thread before dyeing, to apply the pretreatment liquid to the thread, wherein the head driver is configured to drive the pretreatment head in conjunction with conveyance of the thread, and wherein the control circuitry is configured to:

calculate a time required for a droplet discharged from a nozzle of the pretreatment head to reach the needle of the embroiderer after the droplet adheres to the thread; and determine whether to execute maintenance of the pretreatment head based on a comparison result between a set time and a total time of a required time of the embroidery and a conveyance time after discharge of the pretreatment head.

5. The liquid discharge apparatus according to claim 1, further comprising:

a dummy discharge receiver to receive dummy discharge droplets discharged from the discharge head for a purpose other than dyeing of the linear medium, wherein the discharge head has a nozzle row in which a plurality of nozzles are aligned in a row, wherein the conveyor conveys the linear medium in parallel to an alignment direction of the nozzle row of the discharge head, and wherein the control circuitry is configured to determine whether to execute a dummy discharge operation including discharge of droplets to the dummy discharge receiver as the maintenance of the discharge head.

6. The liquid discharge apparatus according to claim 5, further comprising:

a head mover to move the discharge head in an orthogonal direction orthogonal to the conveyance direction of the linear medium, wherein the dummy discharge operation includes:

retracting the nozzle row of the discharge head performing a dyeing operation from a position facing the linear medium;

discharging dummy discharge droplets from the nozzle row of the discharge head retracted, to the dummy discharge receiver; and returning the nozzle row of the discharge head to the position facing the linear medium.

7. The liquid discharge apparatus according to claim 5, further comprising:

a first electrode disposed on a nozzle surface of the discharge head on which the nozzle row is formed, the first electrode extending in a same direction as the alignment direction of the nozzle row, the first electrode being adjacent to the nozzle row in a direction orthogonal to the alignment direction; and a second electrode disposed on a surface facing at least a portion of the nozzle surface of the discharge head across the linear medium, the second electrode being to generate an electric field between the first electrode and the second electrode, wherein the dummy discharge operation includes:

generating the electric field between the first electrode and the second electrode;

discharging dummy discharge droplets from the nozzle row of the discharge head in a state where the electric field is generated, to deflect the dummy discharge droplets during flight and land the dummy discharge droplets on the dummy discharge receiver; and stopping generation of the electric field.

8. An embroidery system comprising:

a liquid discharger to dye a linear medium which includes a thread;

an embroidery apparatus to perform embroidery on a cloth using the thread fed from the liquid discharger; and control circuitry, wherein the liquid discharger includes:

a discharge head including a nozzle to discharge droplets onto the thread to dye the thread;

a conveyor to convey the thread in conjunction with the embroidery apparatus; and a head driver to drive the discharge head in conjunction with conveyance of the thread, wherein the embroidery apparatus includes:

a needle; and an embroiderer to perform embroidery on a cloth using the thread passed through the needle, wherein the control circuitry is configured to:

calculate a required time of the embroidery for each dyeing job; and determine whether to execute maintenance of the discharge head based on the required time, wherein the control circuitry is mounted on the liquid discharger, the embroidery apparatus, or a host controller that is connectable to the embroidery system, wherein the embroiderer creates embroidery data based on an embroidery original and performs embroidery on a cloth using the thread passed through the needle in accordance with the embroidery data, wherein one dyeing job is an operation based on a thread dyeing instruction associated with one embroidery original, wherein the control circuitry is configured to acquire a number of stitches and thread linear-velocity information of the embroidery data created based on an embroidery image from the embroidery apparatus, wherein the control circuitry is configured to calculate an estimated required time of embroidery associated with a dyeing job for outputting the embroidery original, based on the number of stitches and the thread linear-velocity information, wherein the control circuitry is configured to determine whether to execute the maintenance of the discharge head based on the estimated required time of the embroidery, the liquid discharger further comprising a memory to store a set time serving as a threshold value for determining whether to execute the maintenance, wherein a job to be executed includes a plurality of dyeing jobs, and wherein the control circuitry is configured to determine to execute the maintenance when a total time of the estimated required time of the embroidery associated with the dyeing job from a previous maintenance execution time to an end time of a next dyeing job is equal to or longer than the set time at an end time of a current dyeing job.

9. The embroidery system according to claim 8, wherein the embroidery apparatus includes:

computing circuitry configured to acquire a number of stitches indicating how many times the needle has been sewn on the cloth in embroidery data; and a linear velocity detector to detect a linear velocity of the thread, and wherein the control circuitry is configured to acquire the number of stitches and thread linear-velocity information of the embroidery data from the embroidery apparatus and calculate the required time of the embroidery for each dyeing job based on the number of stitches and the thread linear-velocity information.

10. A method of controlling a liquid discharge apparatus to be coupled to a post-processor to perform post-processing using a linear medium which includes a thread such that the post-processor is disposed downstream from the liquid discharge apparatus in a conveyance direction of the linear medium, the liquid discharge apparatus including: a discharge head including a dyeing head having a nozzle to discharge droplets onto a linear medium to dye the linear medium; a conveyor to convey the linear medium in conjunction with the post-processor;

and a head driver to drive the discharge head in conjunction with conveyance of the linear medium, the method comprising:

calculating a required time of the post-processing for each dyeing job; and determining whether to execute maintenance of the dyeing head based on the required time of the post-processing for each dyeing job, wherein the post-processor is an embroidery apparatus including a needle and an embroiderer to create embroidery data based on an embroidery original and perform embroidery on a cloth using a thread passed through the needle in accordance with the embroidery data, wherein one dyeing job is an operation based on a thread dyeing instruction associated with one embroidery original, wherein the method further comprises:

acquiring a number of stitches and thread linear-velocity information of the embroidery data created based on an embroidery image from the embroidery apparatus, calculating an estimated required time of embroidery associated with a dyeing job for outputting the embroidery original, based on the number of stitches and the thread linear-velocity information, determining whether to execute the maintenance of the discharge head based on the estimated required time of the embroidery, wherein a job to be executed includes a plurality of dyeing jobs, and the method further comprises determining to execute the maintenance when a total time of the estimated required time of the embroidery associated with the dyeing job from a previous maintenance execution time to an end time of a next dyeing job is equal to or longer than the set time at an end time of a current dyeing job.

11. A non-transitory computer-readable storage medium storing computer-readable program code that, when executed by a computer, cause the computer to execute a method in a liquid discharge apparatus, the liquid discharge apparatus to be coupled to a post-processor to perform post-processing using a linear medium such that the post processor is disposed downstream from the liquid discharge apparatus in a conveyance direction of the linear medium, the liquid discharge apparatus including: a discharge head including a dyeing head having a nozzle to discharge droplets onto a linear medium to dye the linear medium; a conveyor to convey the linear medium in conjunction with the post processor;

and a head driver to drive the discharge head in conjunction with conveyance of the linear medium, the method comprising:

calculating a required time of the post-processing for each dyeing job; and determining whether to execute maintenance of the dyeing head based on the required time of the post-processing for each dyeing job, wherein the post-processor is an embroidery apparatus including a needle and an embroiderer to create embroidery data based on an embroidery original and perform embroidery on a cloth using a thread passed through the needle in accordance with the embroidery data, wherein one dyeing job is an operation based on a thread dyeing instruction associated with one embroidery original, wherein the method further comprises:

acquiring a number of stitches and thread linear-velocity information of the embroidery data created based on an embroidery image from the embroidery apparatus, calculating an estimated required time of embroidery associated with a dyeing job for outputting the embroidery original, based on the number of stitches and the thread linear-velocity information, determining whether to execute the maintenance of the discharge head based on the estimated required time of the embroidery, wherein a job to be executed includes a plurality of dyeing jobs, and the method further comprises determining to execute the maintenance when a total time of the estimated required time of the embroidery associated with the dyeing job from a previous maintenance execution time to an end time of a next dyeing job is equal to or longer than the set time at an end time of a current dyeing job.

* * * * *